United States Patent
Cui et al.

(10) Patent No.: US 12,238,559 B2
(45) Date of Patent: Feb. 25, 2025

(54) MEASUREMENT GAP PATTERN USE AND MANAGEMENT FOR WIRELESS COMMUNICATION SYSTEMS

(71) Applicant: Apple Inc., Cupertino, CA (US)

(72) Inventors: Jie Cui, Cupertino, CA (US); Yang Tang, Cupertino, CA (US); Qiming Li, Cupertino, CA (US); Zhibin Yu, Cupertino, CA (US); Hua Li, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 353 days.

(21) Appl. No.: 17/440,675

(22) PCT Filed: May 1, 2020

(86) PCT No.: PCT/US2020/031130
§ 371 (c)(1),
(2) Date: Sep. 17, 2021

(87) PCT Pub. No.: WO2020/223681
PCT Pub. Date: Nov. 5, 2020

(65) Prior Publication Data
US 2022/0182867 A1 Jun. 9, 2022

Related U.S. Application Data

(60) Provisional application No. 62/842,416, filed on May 2, 2019.

(51) Int. Cl.
*H04W 24/10* (2009.01)
(52) U.S. Cl.
CPC .................................. *H04W 24/10* (2013.01)
(58) Field of Classification Search
None
See application file for complete search history.

(56) References Cited

U.S. PATENT DOCUMENTS 11,134,404 B2 * 9/2021 Nurminen ............. H04W 24/10
2019/0306734 A1 * 10/2019 Huang ................... H04W 24/08
(Continued)

FOREIGN PATENT DOCUMENTS

| CN | 107637119 | 1/2018 |
| CN | 109246846 | 1/2019 |
| WO | WO 2016187066 | 11/2016 |

OTHER PUBLICATIONS

[No Author Listed], "3rd Generation Partnership Project; Technical Specification Group Radio Access Network; NR; NR and NG-RAN Overall Description; Stage 2 (Release 15)," 3GPP TS 38.300, V 15.5.0, Apr. 9, 2019, pp. 1-97.

(Continued)

*Primary Examiner* — Adolf Dsouza
(74) *Attorney, Agent, or Firm* — Fish & Richardson P.C.

(57) ABSTRACT

A user equipment (UE) device is configured for performing a signal measurement for wireless communication in a new radio (NR) network. The UE is configured to determine a frequency range (FR) of a serving cell configured to send a signal that is measured by the UE using a signal measurement. The UE configures a measurement gap (MG) pattern to perform the signal measurement. Configuring the measurement gap includes determining that the frequency range of the serving cell includes frequencies of a second frequency range (FR2), determining that a measurement object (MO) configuration for the FR2 is available, setting a measurement gap repetition periodicity (MGRP) value for the signal measurement, and setting a measurement gap length (MGL) value for the signal measurement. The UE performs a signal measurement using the MGRP value and the MGL value.

20 Claims, 8 Drawing Sheets

(56) References Cited

U.S. PATENT DOCUMENTS

2021/0014751 A1* 1/2021 Callender ......... H04W 72/0446
2021/0014752 A1* 1/2021 Axmon ............... H04W 36/165

OTHER PUBLICATIONS

[No Author Listed], "3rd Generation Partnership Project; Technical Specification Group Radio Access Network; NR; Radio Resource Control (RRC) protocol specification (Release 15)," 3GPP TS 38.331 V 15.5.1, Apr. 16, 2019, pp. 1-491.

[No Author Listed], 3rd Generation Partnership Project; Technical Specification Group Radio Access Network; NR; Requirements for support of radio resource management (Release 15), 3GPP TS 38.133 V 15.4.0, Jan. 17, 2019, 876 pages.

[No Author Listed], "3rd Generation Partnership Project; Technical Specification Group Radio Access Network; NR; Requirements for support of radio resource management (Release 15)," 3GPP TS 38.133 V 15.5.0, Apr. 13, 2019, pp. 20-170.

[No Author Listed], "3rd Generation Partnership Project; Technical Specification Group Radio Access Network; NR; User Equipment (UE) radio access capabilities (Release 15)," 3GPP TS 38.306 V 15.5.0, Apr. 11, 2019, pp. 1-49.

[No Author Listed], "LTE; Evolved Universal Terrestrial Radio Access (E-UTRA); Radio Resource Control (RRC); Protocol Specification (3GPP TS 36.331 version 15.4.0 Release 15)," ETSI TS 36.331 V 15.4.0, Apr. 2019, 929 pages.

International Preliminary Report on Patentability in International Appln. No. PCT/US2020/031130, dated Jul. 28, 2020, 14 pages.

International Search Report and Written Opinion in International Appln. No. PCT/US2020/031130, dated Jul. 28, 2020, 21 pages.

RAN2, "LS on Capability of measurement gap patterns," 3GPP TSG RRAN WG4 Meeting #90bis, R4-1902811, Xian, China, Apr. 8-12, 2019, 2 pages.

[No Author Listed], "3rd Generation Partnership Project; Technical Specification Group Radio Access Network; Evolved Universal Terrestrial Radio Access (E-UTRA); Requirements for support of radio resource management (Release 16)," 3GPP TS 36.133 V16.1.0, Mar. 2019, 2743 pages.

* cited by examiner

MEASUREMENT GAP PATTERN USE AND MANAGEMENT FOR WIRELESS COMMUNICATION SYSTEMS

CROSS-REFERENCE TO RELATED APPLICATION

This application claims priority to U.S. Provisional Patent Application No. 62/842,416, titled, filed May 2, 2019, the entire content of which is incorporated herein by reference.

TECHNICAL FIELD

This disclosure relates generally to configuring communications between radio link control entities and user equipment.

BACKGROUND

Wireless communication systems are rapidly growing in usage. Further, wireless communication technology has evolved from voice-only communications to also include the transmission of data, such as Internet and multimedia content, to a variety of devices. To accommodate a growing number of devices communicating both voice and data signals, many wireless communication systems share the available communication channel resources among devices.

SUMMARY

This disclosure describes UE configurations for measurement gap (MG) pattern use and management for next generation (5G) wireless communication systems. More specifically, this disclosure describes several solutions for MG pattern usage. First, mandatory MG patterns for a communications device (e.g., a UE) are described. Second, MG capability reports from LTE radio access technologies (RATs) and NR RATs are described. Third, UE measurement capability from the MG table is shown.

In a general aspect, a process for configuring, by user equipment (UE), one or more measurement gap patterns for wireless communication in a new radio (NR) network includes determining a frequency range (FR) of a serving cell configured to send a signal that is measured by the UE using a signal measurement. The process includes configuring a measurement gap (MG) pattern to perform the signal measurement. Configuring the measurement gap includes determining that the frequency range of the serving cell includes frequencies of a second frequency range (FR2). Configuring the measurement gap includes determining that a measurement object (MO) configuration for the FR2 is available. Configuring the measurement gap includes, in response to determining that the configuration with the MO for the FR2 is available, setting a measurement gap repetition periodicity (MGRP) value for the signal measurement. Configuring the measurement gap includes, in response to determining that the configuration with the MO for the FR2 is available, setting a measurement gap length (MGL) value for the signal measurement. The process includes performing a signal measurement using the MGRP value and the MGL value.

In an embodiment, the MG pattern comprises a mandatory MG pattern, where the MGRP value is one of 40 milliseconds or 80 milliseconds. In some implementations, the MGL is 6 milliseconds. In some implementations, the MGRP value is one of 20 milliseconds, 40 milliseconds or 80 milliseconds, and where the MGL value is 5.5 milliseconds.

In some implementations, determining that the MO configuration for the FR2 is available comprises determining that no other MO configuration is available. In some implementations, determining that the MO configuration for the FR2 is available includes determining that a MO configuration for a first frequency range (FR1) is available in addition to the MO configuration for FR2. In some implementations, determining that the MO configuration for the FR2 is available includes determining that a MO configuration for an evolved universal mobile telecommunications system terrestrial radio access (E-UTRA) scenario is available in addition to the MO configuration for the FR2. In some implementations, determining that the MO configuration for the FR2 is available includes determining that a MO configuration for a non-NR radio access technology (non-NR RAT) is available in addition to the MO configuration for the FR2.

In some embodiments, the process includes determining, by the UE, a mode of operation and generating a MG pattern capability report based on the mode of operation, the MG pattern capability report indicating that any MG pattern including the MGL value of less than or equal to 6 milliseconds and the MGRP value of less than 160 milliseconds is supported for the signal measurement. In some implementations, the mode of operation comprises one of E-UTRA-NR Dual Connectivity (EN-DC), NR-E-UTRA Dual Connectivity (NE-DC), standalone new radio (NR SA), new radio carrier aggregation (NR CA), new radio dual connectivity (NR-DC), or standalone long term evolution (LTE SA). In some implementations, the mode of operation comprises EN-DC, and where generating the MG pattern capability report comprises: disabling a bits 2~11 in a supportedGapPattern message. In some implementations, the mode of operation comprises EN-DC, and where generating the MG pattern capability report comprises: reporting same MG capability data between "shortMeasurementGap+measGapPatterns" messages and bits 2~11 of a supportedGapPattern message.

In a general aspect, a UE device configured for performing a signal measurement for wireless communication in a new radio (NR) network includes one or more processors and a memory storing instructions that, when executed by the one or more processors, cause the one or more processors to perform operations. The operations include configuring a measurement gap (MG) pattern to perform the signal measurement. Configuring the measurement gap includes determining that the frequency range of the serving cell includes frequencies of a second frequency range (FR2). Configuring the measurement gap includes determining that a measurement object (MO) configuration for the FR2 is available. Configuring the measurement gap includes, in response to determining that the configuration with the MO for the FR2 is available, setting a measurement gap repetition periodicity (MGRP) value for the signal measurement. Configuring the measurement gap includes, in response to determining that the configuration with the MO for the FR2 is available, setting a measurement gap length (MGL) value for the signal measurement. The operations include performing a signal measurement using the MGRP value and the MGL value.

In an embodiment, the MG pattern comprises a mandatory MG pattern, where the MGRP value is one of 40 milliseconds or 80 milliseconds. In some implementations, the MGL is 6 milliseconds. In some implementations, the MGRP value is one of 20 milliseconds, 40 milliseconds or 80 milliseconds, and where the MGL value is 5.5 milliseconds.

In some implementations, determining that the MO configuration for the FR2 is available comprises determining that no other MO configuration is available. In some implementations, determining that the MO configuration for the FR2 is available includes determining that a MO configuration for a first frequency range (FR1) is available in addition to the MO configuration for FR2. In some implementations, determining that the MO configuration for the FR2 is available includes determining that a MO configuration for an evolved universal mobile telecommunications system terrestrial radio access (E-UTRA) scenario is available in addition to the MO configuration for the FR2. In some implementations, determining that the MO configuration for the FR2 is available includes determining that a MO configuration for a non-NR radio access technology (non-NR RAT) is available in addition to the MO configuration for the FR2.

In some embodiments, the operations include determining, by the UE, a mode of operation and generating a MG pattern capability report based on the mode of operation, the MG pattern capability report indicating that any MG pattern including the MGL value of less than or equal to 6 milliseconds and the MGRP value of less than 160 milliseconds is supported for the signal measurement. In some implementations, the mode of operation comprises one of E-UTRA-NR Dual Connectivity (EN-DC), NR-E-UTRA Dual Connectivity (NE-DC), standalone new radio (NR SA), new radio carrier aggregation (NR CA), new radio dual connectivity (NR-DC), or standalone long term evolution (LTE SA). In some implementations, the mode of operation comprises EN-DC, and where generating the MG pattern capability report comprises: disabling a bits 2~11 in a supportedGapPattern message. In some implementations, the mode of operation comprises EN-DC, and where generating the MG pattern capability report comprises: reporting same MG capability data between "shortMeasurementGap+measGapPatterns" messages and bits 2~11 of a supportedGapPattern message.

The details of one or more embodiments are set forth in the accompanying drawings and the description below. Other features and advantages will be apparent from the description and drawings, and from the claims.

BRIEF DESCRIPTION OF DRAWINGS

Like reference symbols in the various drawings indicate like elements.

DETAILED DESCRIPTION

This disclosure describes measurement gap (MG) pattern use and management for next generation (5G) wireless communication systems. More specifically, this disclosure describes several solutions for MG pattern usage. The UE can use mandatory MG patterns for a communications device (e.g., user equipment UE) in which the UE is configured to use existing mandatory MG patterns or new mandatory MG patterns in response to detecting an operational mode and serving cell frequency. The UE can change its MG capability reports from LTE radio access technologies (RATs) and NR RATs to accommodate the additional MG patterns that are available for certain operating modes. A new MG table for UE measurement capability from an MG table is provided.

Figure 1:
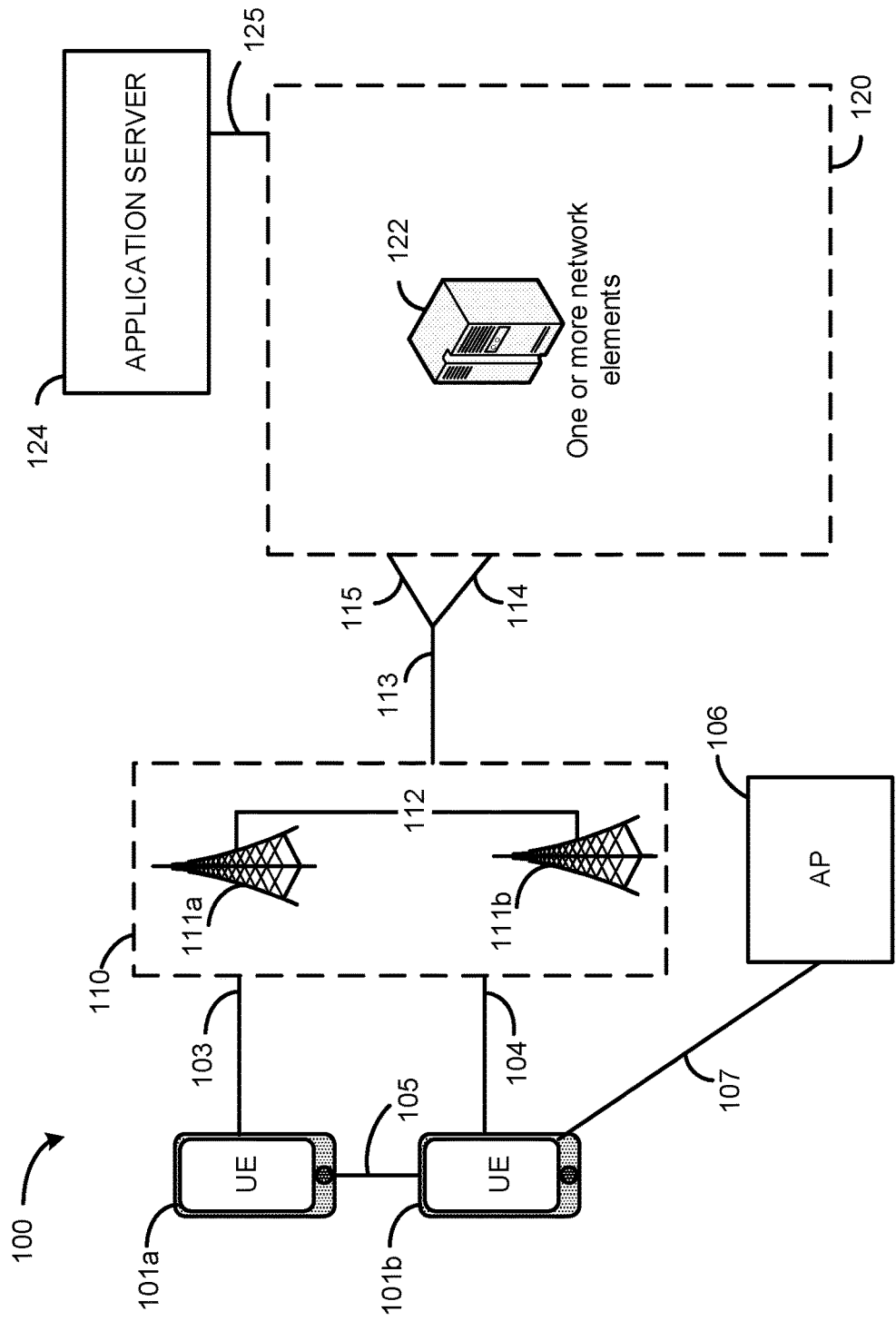
FIG. 1 illustrates an example wireless communication system.

FIG. 1 illustrates an example wireless communication system 100. For purposes of convenience and without limitation, the example system 100 is described in the context of the LTE and 5G NR communication standards as defined by the Third Generation Partnership Project (3GPP) technical specifications. However, the technology described herein may be implemented in other communication systems using other communication standards, such as other 3GPP standards or IEEE 802.16 protocols (e.g., WMAN or WiMAX), among others.

The system 100 includes UE 101a and UE 101b (collectively referred to as the "UEs 101"). In this example, the UEs 101 are illustrated as smartphones (e.g., handheld touchscreen mobile computing devices connectable to one or more cellular networks). In other examples, any of the UEs 101 may include other mobile or non-mobile computing devices, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M) devices, Internet of Things (IoT) devices, or combinations of them, among others.

In some examples, any of the UEs 101 may be IoT UEs, which can include a network access layer designed for low-power IoT applications utilizing short-lived UE connections. An IoT UE can utilize technologies such as M2M or MTC for exchanging data with an MTC server or device using, for example, a public land mobile network (PLMN), proximity services (ProSe), device-to-device (D2D) communication, sensor networks, IoT networks, or combinations of them, among others. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages or status updates) to facilitate the connections of the IoT network.

The UEs 101 are configured to connect (e.g., communicatively couple) with an access network (AN) or radio access network (RAN) 110. In some examples, the RAN 110 may be a next generation RAN (NG RAN), an evolved UMTS terrestrial radio access network (E-UTRAN), or a legacy RAN, such as a UMTS terrestrial radio access network (UTRAN) or a GSM EDGE radio access network (GERAN). As used herein, the term "NG RAN" may refer to a RAN 110 that operates in a 5G NR system 100, and the term "E-UTRAN" may refer to a RAN 110 that operates in an LTE or 4G system 100.

To connect to the RAN 110, the UEs 101 utilize connections (or channels) 103 and 104, respectively, each of which may include a physical communications interface or layer, as described below. In this example, the connections 103 and 104 are illustrated as an air interface to enable communicative coupling, and can be consistent with cellular communications protocols, such as a global system for mobile communications (GSM) protocol, a code-division multiple access (CDMA) network protocol, a push-to-talk (PTT) protocol, a PTT over cellular (POC) protocol, a universal mobile telecommunications system (UMTS) protocol, a 3GPP LTE protocol, a 5G NR protocol, or combinations of them, among other communication protocols. In some examples, the UEs 101 may directly exchange communication data using an interface 105, such as a ProSe interface. The interface 105 may alternatively be referred to as a sidelink interface 105 and may include one or more logical channels, such as a physical sidelink control channel (PSCCH), a physical sidelink shared channel (PSSCH), a physical sidelink downlink channel (PSDCH), or a physical sidelink broadcast channel (PSBCH), or combinations of them, among others.

The UE 101b is shown to be configured to access an access point (AP) 106 (also referred to as "WLAN node 106," "WLAN 106," "WLAN Termination 106," "WT 106" or the like) using a connection 107. The connection 107 can include a local wireless connection, such as a connection consistent with any IEEE 802.11 protocol, in which the AP 106 would include a wireless fidelity (Wi-Fi®) router. In this example, the AP 106 is shown to be connected to the Internet without connecting to the core network of the wireless system, as described in further detail below. In various examples, the UE 101b, RAN 110, and AP 106 may be configured to use LTE-WLAN aggregation (LWA) operation or LTW/WLAN radio level integration with IPsec tunnel (LWIP) operation. The LWA operation may involve the UE 101b in RRC_CONNECTED being configured by a RAN node 111a, 111b to utilize radio resources of LTE and WLAN. LWIP operation may involve the UE 101b using WLAN radio resources (e.g., connection 107) using IPsec protocol tunneling to authenticate and encrypt packets (e.g., IP packets) sent over the connection 107. IPsec tunneling may include encapsulating the entirety of original IP packets and adding a new packet header, thereby protecting the original header of the IP packets.

The RAN 110 can include one or more AN nodes or RAN nodes 111a and 111b (collectively referred to as "RAN nodes 111" or "RAN node 111") that enable the connections 103 and 104. As used herein, the terms "access node," "access point," or the like may describe equipment that provides the radio baseband functions for data or voice connectivity, or both, between a network and one or more users. These access nodes can be referred to as base stations (BS), gNodeBs, gNBs, eNodeBs, eNBs, NodeBs, RAN nodes, rode side units (RSUs), transmission reception points (TRxPs or TRPs), and the link, and can include ground stations (e.g., terrestrial access points) or satellite stations providing coverage within a geographic area (e.g., a cell), among others. As used herein, the term "NG RAN node" may refer to a RAN node 111 that operates in an 5G NR system 100 (for example, a gNB), and the term "E-UTRAN node" may refer to a RAN node 111 that operates in an LTE or 4G system 100 (e.g., an eNB). In some examples, the RAN nodes 111 may be implemented as one or more of a dedicated physical device such as a macrocell base station, or a low power (LP) base station for providing femtocells, picocells or other like cells having smaller coverage areas, smaller user capacity, or higher bandwidth compared to macrocells.

In some examples, some or all of the RAN nodes 111 may be implemented as one or more software entities running on server computers as part of a virtual network, which may be referred to as a cloud RAN (CRAN) or a virtual baseband unit pool (vBBUP). The CRAN or vBBUP may implement a RAN function split, such as a packet data convergence protocol (PDCP) split in which radio resource control (RRC) and PDCP layers are operated by the CRAN/vBBUP and other layer two (e.g., data link layer) protocol entities are operated by individual RAN nodes 111; a medium access control (MAC)/physical layer (PHY) split in which RRC, PDCP, MAC, and radio link control (RLC) layers are operated by the CRAN/vBBUP and the PHY layer is operated by individual RAN nodes 111; or a "lower PHY" split in which RRC, PDCP, RLC, and MAC layers and upper portions of the PHY layer are operated by the CRAN/vBBUP and lower portions of the PHY layer are operated by individual RAN nodes 111. This virtualized framework allows the freed-up processor cores of the RAN nodes 111 to perform, for example, other virtualized applications. In some examples, an individual RAN node 111 may represent individual gNB distributed units (DUs) that are connected to a gNB central unit (CU) using individual F1 interfaces (not shown in FIG. 1). In some examples, the gNB-DUs may include one or more remote radio heads or RFEMs (see, e.g., FIG. 2), and the gNB-CU may be operated by a server that is located in the RAN 110 (not shown) or by a server pool in a similar manner as the CRAN/vBBUP. Additionally or alternatively, one or more of the RAN nodes 111 may be next generation eNBs (ng-eNBs), including RAN nodes that provide E-UTRA user plane and control plane protocol terminations toward the UEs 101, and are connected to a 5G core network (e.g., core network 120) using a next generation interface.

In vehicle-to-everything (V2X) scenarios, one or more of the RAN nodes 111 may be or act as RSUs. The term "Road Side Unit" or "RSU" refers to any transportation infrastructure entity used for V2X communications. A RSU may be implemented in or by a suitable RAN node or a stationary (or relatively stationary) UE, where a RSU implemented in or by a UE may be referred to as a "UE-type RSU," a RSU implemented in or by an eNB may be referred to as an "eNB-type RSU," a RSU implemented in or by a gNB may be referred to as a "gNB-type RSU," and the like. In some examples, an RSU is a computing device coupled with radio frequency circuitry located on a roadside that provides connectivity support to passing vehicle UEs 101 (vUEs 101). The RSU may also include internal data storage circuitry to store intersection map geometry, traffic statistics, media, as well as applications or other software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) or provide connectivity to one or more cellular networks to provide uplink and downlink communications, or both. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller or a backhaul network, or both.

Any of the RAN nodes 111 can terminate the air interface protocol and can be the first point of contact for the UEs 101. In some examples, any of the RAN nodes 111 can fulfill various logical functions for the RAN 110 including, but not limited to, radio network controller (RNC) functions such as radio bearer management, uplink and downlink dynamic radio resource management and data packet scheduling, and mobility management.

In some examples, the UEs 101 can be configured to communicate using orthogonal frequency division multiplexing (OFDM) communication signals with each other or with any of the RAN nodes 111 over a multicarrier communication channel in accordance with various communication techniques, such as, but not limited to, OFDMA communication techniques (e.g., for downlink communications) or SC-FDMA communication techniques (e.g., for uplink and ProSe or sidelink communications), although the scope of the techniques described here not limited in this respect. The OFDM signals can comprise a plurality of orthogonal subcarriers.

In some examples, a downlink resource grid can be used for downlink transmissions from any of the RAN nodes 111 to the UEs 101, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

In some examples, the UEs 101 and the RAN nodes 111 communicate (e.g., transmit and receive) data over a licensed medium (also referred to as the "licensed spectrum" or the "licensed band") and an unlicensed shared medium (also referred to as the "unlicensed spectrum" or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 101 and the RAN nodes 111 may operate using license assisted access (LAA), enhanced-LAA (eLAA), or further enhanced-LAA (feLAA) mechanisms. In these embodiments, the UEs 101 and the RAN nodes 111 may perform one or more known medium-sensing operations or carrier-sensing operations, or both, to determine whether one or more channels in the unlicensed spectrum are unavailable or otherwise occupied prior to transmitting in the unlicensed spectrum. The medium/carrier sensing operations may be performed according to a listen-before-talk (LBT) protocol. LBT is a mechanism in which equipment (for example, UEs 101, RAN nodes 111) senses a medium (for example, a channel or carrier frequency) and transmits when the medium is sensed to be idle (or when a specific channel in the medium is sensed to be unoccupied). The medium sensing operation may include clear channel assessment (CCA), which uses energy detection to determine the presence or absence of other signals on a channel in order to determine if a channel is occupied or clear. This LBT mechanism allows cellular/LAA networks to coexist with incumbent systems in the unlicensed spectrum and with other LAA networks. Energy detection may include sensing RF energy across an intended transmission band for a period of time and comparing the sensed RF energy to a predefined or configured threshold.

The incumbent systems in the 5 GHz band can be WLANs based on IEEE 802.11 technologies. WLAN employs a contention-based channel access mechanism (e.g., CSMA with collision avoidance (CSMA/CA)). In some examples, when a WLAN node (e.g., a mobile station (MS), such as UE 101, AP 106, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the contention window size (CWS), which is increased exponentially upon the occurrence of collision and reset to a minimum value as the transmission succeeds. In some examples, the LBT mechanism designed for LAA is similar to the CSMA/CA of WLAN. In some examples, the LBT procedure for DL or UL transmission bursts, including PDSCH or PUSCH transmissions, respectively, may have an LAA contention window that is variable in length between X and Y extended CAA (ECCA) slots, where X and Y are minimum and maximum values for the CWSs for LAA. In one example, the minimum CWS for an LAA transmission may be 9 microseconds (µs); however, the size of the CWS and a maximum channel occupancy time (for example, a transmission burst) may be based on governmental regulatory requirements.

In some examples, the LAA mechanisms are built on carrier aggregation technologies of LTE-Advanced systems. In CA, each aggregated carrier is referred to as a component carrier. In some examples, a component carrier may have a bandwidth of 1.4, 3, 5, 10, 15 or 20 MHz, and a maximum of five component carriers can be aggregated to provide a maximum aggregated bandwidth is 100 MHz. In frequency division duplex (FDD) systems, the number of aggregated carriers can be different for DL and UL. For example, the number of UL component carriers can be equal to or lower than the number of DL component carriers. In some cases, individual component carriers can have a different bandwidth than other component carriers. In time division duplex (TDD) systems, the number of component carriers as well as the bandwidths of each component carrier is usually the same for DL and UL.

Carrier aggregation can also include individual serving cells to provide individual component carriers. The coverage of the serving cells may differ, for example, because component carriers on different frequency bands may experience different path loss. A primary service cell (PCell) may provide a primary component carrier for both UL and DL, and may handle RRC and non-access stratum (NAS) related activities. The other serving cells are referred to as secondary component carriers (SCells), and each SCell may provide an individual secondary component carrier for both UL and DL. The secondary component carriers may be added and removed as required, while changing the primary component carrier may require the UE 101 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 101. The PDCCH carries information about the transport format and resource allocations related to the PDSCH channel, among other things. It may also inform the UEs 101 about the transport format, resource allocation, and hybrid automatic repeat request (HARQ) information related to the uplink shared channel. Downlink scheduling (e.g., assigning control and shared channel resource blocks to the UE 101b within a cell) may be performed at any of the RAN nodes 111 based on channel quality information fed back from any of the UEs 101. The downlink resource assignment information may be sent on the PDCCH used for (e.g., assigned to) each of the UEs 101.

The PDCCH uses control channel elements (CCEs) to convey the control information. Before being mapped to resource elements, the PDCCH complex-valued symbols may first be organized into quadruplets, which may then be permuted using a sub-block interleaver for rate matching. In some examples, each PDCCH may be transmitted using one or more of these CCEs, in which each CCE may correspond to nine sets of four physical resource elements collectively referred to as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. In LTE, there can be four or more different PDCCH formats defined with different numbers of CCEs (e.g., aggregation level, L=1, 2, 4, or 8).

Some embodiments may use concepts for resource allocation for control channel information that are an extension of the above-described concepts. For example, some embodiments may utilize an enhanced PDCCH (EPDCCH) that uses PDSCH resources for control information transmission. The EPDCCH may be transmitted using one or more enhanced CCEs (ECCEs). Similar to above, each ECCE may correspond to nine sets of four physical resource elements collectively referred to as an enhanced REG (EREG). An ECCE may have other numbers of EREGs in some examples.

The RAN nodes 111 are configured to communicate with one another using an interface 112. In examples, such as where the system 100 is an LTE system (e.g., when the core network 120 is an evolved packet core (EPC)), the interface 112 may be an X2 interface 112. The X2 interface may be defined between two or more RAN nodes 111 (e.g., two or more eNBs and the like) that connect to the EPC 120, or between two eNBs connecting to EPC 120, or both. In some examples, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a master eNB to a secondary eNB; information about successful in sequence delivery of PDCP protocol data units (PDUs) to a UE 101 from a secondary eNB for user data; information of PDCP PDUs that were not delivered to a UE 101; information about a current minimum desired buffer size at the secondary eNB for transmitting to the UE user data, among other information. The X2-C may provide intra-LTE access mobility functionality, including context transfers from source to target eNBs or user plane transport control; load management functionality; inter-cell interference coordination functionality, among other functionality.

In some examples, such as where the system 100 is a 5GNR system (e.g., when the core network 120 is a 5G core network), the interface 112 may be an Xn interface 112. The Xn interface may be defined between two or more RAN nodes 111 (e.g., two or more gNBs and the like) that connect to the 5G core network 120, between a RAN node 111 (e.g., a gNB) connecting to the 5G core network 120 and an eNB, or between two eNBs connecting to the 5G core network 120, or combinations of them. In some examples, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 101 in a connected mode (e.g., CM-CONNECTED) including functionality to manage the UE mobility for connected mode between one or more RAN nodes 111, among other functionality. The mobility support may include context transfer from an old (source) serving RAN node 111 to new (target) serving RAN node 111, and control of user plane tunnels between old (source) serving RAN node 111 to new (target) serving RAN node 111. A protocol stack of the Xn-U may include a transport network layer built on Internet Protocol (IP) transport layer, and a GPRS tunneling protocol for user plane (GTP-U) layer on top of a user datagram protocol (UDP) or IP layer(s), or both, to carry user plane PDUs. The Xn-C protocol stack may include an application layer signaling protocol (referred to as Xn Application Protocol (Xn-AP)) and a transport network layer that is built on a stream control transmission protocol (SCTP). The SCTP may be on top of an IP layer, and may provide the guaranteed delivery of application layer messages. In the transport IP layer, point-to-point transmission is used to deliver the signaling PDUs. In other embodiments, the Xn-U protocol stack or the Xn-C protocol stack, or both, may be same or similar to the user plane and/or control plane protocol stack(s) shown and described herein.

The RAN 110 is shown to be communicatively coupled to a core network 120 (referred to as a "CN 120"). The CN 120 includes one or more network elements 122, which are configured to offer various data and telecommunications services to customers/subscribers (e.g., users of UEs 101) who are connected to the CN 120 using the RAN 110. The components of the CN 120 may be implemented in one physical node or separate physical nodes and may include components to read and execute instructions from a machine-readable or computer-readable medium (e.g., a non-transitory machine-readable storage medium). In some examples, network functions virtualization (NFV) may be used to virtualize some or all of the network node functions described here using executable instructions stored in one or more computer-readable storage mediums, as described in further detail below. A logical instantiation of the CN 120 may be referred to as a network slice, and a logical instantiation of a portion of the CN 120 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable embodiments of one or more network components or functions, or both.

Generally, an application server 130 may be an element offering applications that use IP bearer resources with the core network (e.g., UMTS packet services (PS) domain, LTE PS data services, among others). The application server 130 can also be configured to support one or more communication services (e.g., VoIP sessions, PTT sessions, group communication sessions, social networking services, among others) for the UEs 101 using the CN 120.

In some examples, the CN 120 may be a 5G core network (referred to as "5GC 120"), and the RAN 110 may be connected with the CN 120 using a next generation interface 113. In some examples, the next generation interface 113 may be split into two parts, an next generation user plane (NG-U) interface 114, which carries traffic data between the RAN nodes 111 and a user plane function (UPF), and the S1 control plane (NG-C) interface 115, which is a signaling interface between the RAN nodes 111 and access and mobility management functions (AMFs).

In some examples, the CN 120 may be an EPC (referred to as "EPC 120" or the like), and the RAN 110 may be connected with the CN 120 using an S1 interface 113. In some examples, the S1 interface 113 may be split into two parts, an S1 user plane (S1-U) interface 114, which carries traffic data between the RAN nodes 111 and the serving gateway (S-GW), and the S1-MME interface 115, which is a signaling interface between the RAN nodes 111 and mobility management entities (MMEs).

Figure 2:
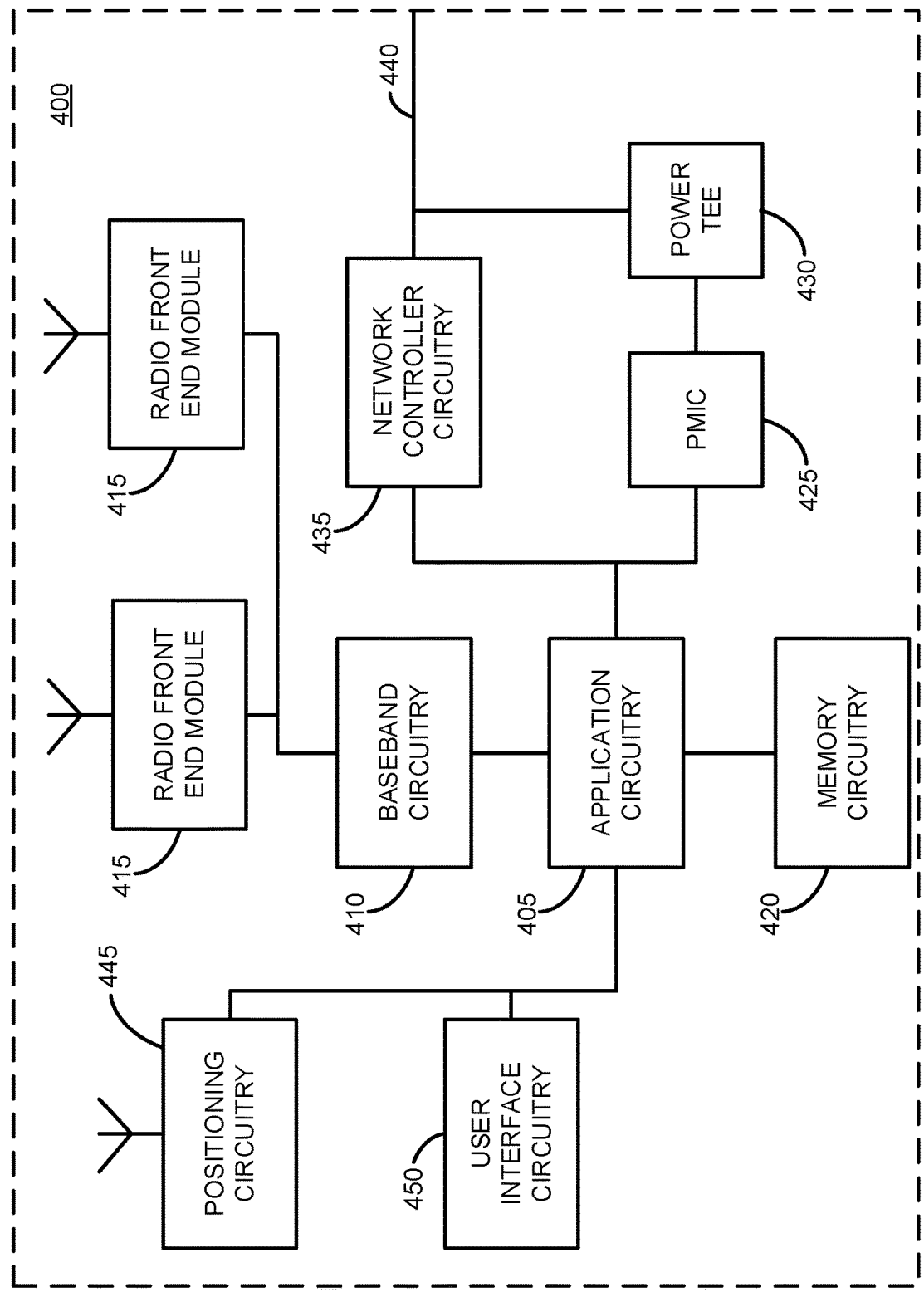
FIG. 2 illustrates an example of infrastructure equipment.

FIG. 2 illustrates an example of infrastructure equipment 400. The infrastructure equipment 400 (or "system 400") may be implemented as a base station, a radio head, a RAN node, such as the RAN nodes 111 or AP 106 shown and described previously, an application server(s) 130, or any other component or device described herein. In other examples, the system 400 can be implemented in or by a UE.

The system 400 includes application circuitry 405, baseband circuitry 410, one or more radio front end modules (RFEMs) 415, memory circuitry 420, power management integrated circuitry (PMIC) 425, power tee circuitry 430, network controller circuitry 435, network interface connector 440, satellite positioning circuitry 445, and user interface circuitry 450. In some examples, the system 400 may include additional elements such as, for example, memory, storage, a display, a camera, one or more sensors, or an input/output (I/O) interface, or combinations of them, among others. In other examples, the components described with reference to the system 400 may be included in more than one device. For example, the various circuitries may be separately included in more than one device for CRAN, vBBU, or other embodiments.

The application circuitry 405 includes circuitry such as, but not limited to, one or more processors (or processor cores), cache memory, one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 405 may be coupled with or may include memory or storage elements and may be configured to execute instructions stored in the memory or storage to enable various applications or operating systems to run on the system 400. In some examples, the memory or storage elements may include on-chip memory circuitry, which may include any suitable volatile or non-volatile memory, such as DRAM, SRAM, EPROM, EEPROM, Flash memory, solid-state memory, or combinations of them, among other types of memory.

The processor(s) of the application circuitry 405 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or combinations of them, among others. In some examples, the application circuitry 405 may include, or may be, a special-purpose processor or controller configured to carry out the various techniques described here. As examples, the processor(s) of application circuitry 405 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some examples, the system 400 may not utilize application circuitry 405, and instead may include a special-purpose processor or controller to process IP data received from an EPC or 5GC, for example.

In some examples, the application circuitry 405 may include one or more hardware accelerators, which may be microprocessors, programmable processing devices, or the like. The one or more hardware accelerators may include, for example, computer vision (CV) or deep learning (DL) accelerators, or both. In some examples, the programmable processing devices may be one or more a field-programmable devices (FPDs) such as field-programmable gate arrays (FPGAs) and the like; programmable logic devices (PLDs) such as complex PLDs (CPLDs) or high-capacity PLDs (HCPLDs); ASICs such as structured ASICs; programmable SoCs (PSoCs), or combinations of them, among others. In such embodiments, the circuitry of application circuitry 405 may include logic blocks or logic fabric, and other interconnected resources that may be programmed to perform various functions, such as the procedures, methods, functions described herein. In some examples, the circuitry of application circuitry 405 may include memory cells (e.g., erasable programmable read-only memory (EPROM), electrically erasable programmable read-only memory (EEPROM), flash memory, static memory (e.g., static random access memory (SRAM) or anti-fuses)) used to store logic blocks, logic fabric, data, or other data in look-up-tables (LUTs) and the like.

The baseband circuitry 410 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 410 are discussed with regard to FIG. 4.

The user interface circuitry 450 may include one or more user interfaces designed to enable user interaction with the system 400 or peripheral component interfaces designed to enable peripheral component interaction with the system 400. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, or combinations of them, among others. Peripheral component interfaces may include, but are not limited to, a nonvolatile memory port, a universal serial bus (USB) port, an audio jack, a power supply interface, among others.

The radio front end modules (RFEMs) 415 may include a millimeter wave (mmWave) RFEM and one or more sub-mmWave radio frequency integrated circuits (RFICs). In some examples, the one or more sub-mmWave RFICs may be physically separated from the mmWave RFEM. The RFICs may include connections to one or more antennas or antenna arrays (see, e.g., antenna array 611 of FIG. 4), and the RFEM may be connected to multiple antennas. In some examples, both mmWave and sub-mmWave radio functions may be implemented in the same physical RFEM 415, which incorporates both mmWave antennas and sub-mmWave.

The memory circuitry 420 may include one or more of volatile memory, such as dynamic random access memory (DRAM) or synchronous dynamic random access memory (SDRAM), and nonvolatile memory (NVM), such as high-speed electrically erasable memory (commonly referred to as Flash memory), phase change random access memory (PRAM), or magnetoresistive random access memory (MRAM), or combinations of them, among others. In some examples, the memory circuitry 420 may include three-dimensional (3D) cross-point (XPOINT) memories from Intel® and Micron®. Memory circuitry 420 may be implemented as one or more of solder down packaged integrated circuits, socketed memory modules and plug-in memory cards, for example.

The PMIC 425 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 430 may provide for electrical power drawn from a network cable to provide both power supply and data connectivity to the infrastructure equipment 400 using a single cable.

The network controller circuitry 435 may provide connectivity to a network using a standard network interface protocol such as Ethernet, Ethernet over GRE Tunnels, Ethernet over Multiprotocol Label Switching (MPLS), or some other suitable protocol. Network connectivity may be provided to and from the infrastructure equipment 400 using network interface connector 440 using a physical connection, which may be electrical (commonly referred to as a "copper interconnect"), optical, or wireless. The network controller circuitry 435 may include one or more dedicated processors or FPGAs, or both, to communicate using one or more of the aforementioned protocols. In some examples, the network controller circuitry 435 may include multiple controllers to provide connectivity to other networks using the same or different protocols.

The positioning circuitry 445 includes circuitry to receive and decode signals transmitted or broadcasted by a positioning network of a global navigation satellite system (GNSS). Examples of a GNSS include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS)), among other systems. The positioning circuitry 445 can include various hardware elements (e.g., including hardware devices such as switches, filters, amplifiers, antenna elements, and the like to facilitate OTA communications) to communicate with components of a positioning network, such as navigation satellite constellation nodes. In some examples, the positioning circuitry 445 may include a Micro-Technology for Positioning, Navigation, and Timing (Micro-PNT) IC that uses a master timing clock to perform position tracking and estimation without GNSS assistance. The positioning circuitry 445 may also be part of, or interact with, the baseband circuitry 410 or RFEMs 415, or both, to communicate with the nodes and components of the positioning network. The positioning circuitry 445 may also provide data (e.g., position data, time data) to the application circuitry 405, which may use the data to synchronize operations with various infrastructure (e.g., RAN nodes 111).

The components shown by FIG. 2 may communicate with one another using interface circuitry, which may include any number of bus or interconnect (IX) technologies such as industry standard architecture (ISA), extended ISA (EISA), peripheral component interconnect (PCI), peripheral component interconnect extended (PCIx), PCI express (PCIe), or any number of other technologies. The bus or IX may be a proprietary bus, for example, used in a SoC based system. Other bus or IX systems may be included, such as an I2C interface, an SPI interface, point to point interfaces, and a power bus, among others.

Figure 3:
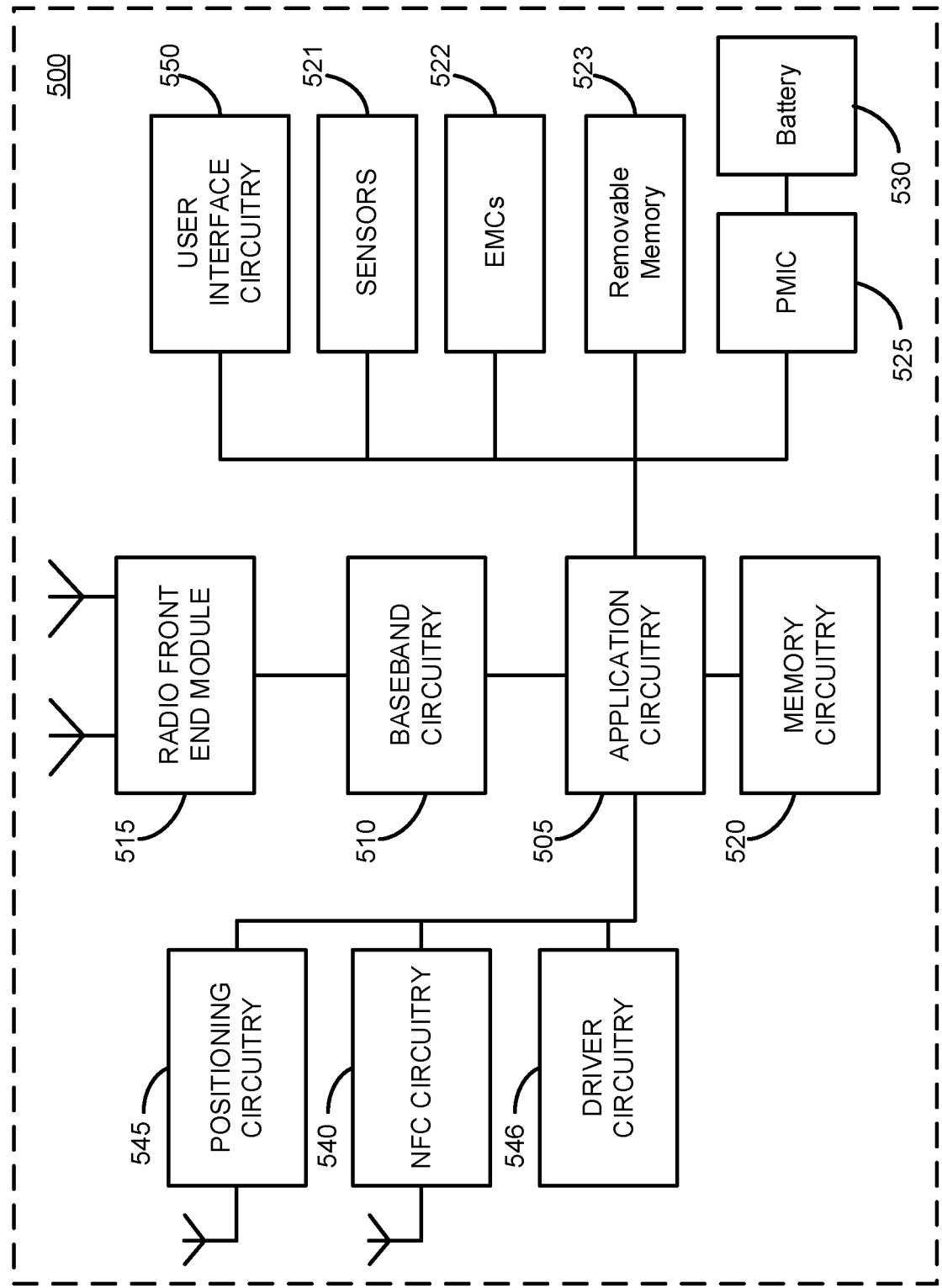
FIG. 3 illustrates an example of a platform or device.

FIG. 3 illustrates an example of a platform 500 (or "device 500"). In some examples, the computer platform 500 may be suitable for use as UEs 101, 201, 301, application servers 130, or any other component or device discussed herein. The platform 500 may include any combinations of the components shown in the example. The components of platform 500 (or portions thereof) may be implemented as integrated circuits (ICs), discrete electronic devices, or other modules, logic, hardware, software, firmware, or a combination of them adapted in the computer platform 500, or as components otherwise incorporated within a chassis of a larger system. The block diagram of FIG. 3 is intended to show a high level view of components of the platform 500. However, in some examples, the platform 500 may include fewer, additional, or alternative components, or a different arrangement of the components shown in FIG. 3.

The application circuitry 505 includes circuitry such as, but not limited to, one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 505 may be coupled with or may include memory/storage elements and may be configured to execute instructions stored in the memory or storage to enable various applications or operating systems to run on the system 500. In some examples, the memory or storage elements may be on-chip memory circuitry, which may include any suitable volatile or nonvolatile memory, such as DRAM, SRAM, EPROM, EEPROM, Flash memory, solid-state memory, or combinations of them, among other types of memory.

The processor(s) of application circuitry 405 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some examples, the application circuitry 405 may include, or may be, a special-purpose processor/controller to carry out the techniques described herein.

As examples, the processor(s) of application circuitry 505 may include an Intel® Architecture Core™ based processor, such as a Quark™, an Atom™, an i3, an i5, an i7, or an MCU-class processor, or another such processor available from Intel® Corporation, Santa Clara, Calif. The processors of the application circuitry 505 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some examples, the application circuitry 505 may be a part of a system on a chip (SoC) in which the application circuitry 505 and other components are formed into a single integrated circuit, or a single package, such as the Edison™ or Galileo™ SoC boards from Intel® Corporation.

Additionally or alternatively, the application circuitry 505 may include circuitry such as, but not limited to, one or more a field-programmable devices (FPDs) such as FPGAs; programmable logic devices (PLDs) such as complex PLDs (CPLDs), high-capacity PLDs (HCPLDs); ASICs such as structured ASICs; programmable SoCs (PSoCs), or combinations of them, among others. In some examples, the application circuitry 505 may include logic blocks or logic fabric, and other interconnected resources that may be programmed to perform various functions, such as the procedures, methods, functions described herein. In some examples, the application circuitry 505 may include memory cells (e.g., erasable programmable read-only memory (EPROM), electrically erasable programmable read-only memory (EEPROM), flash memory, static memory (e.g., static random access memory (SRAM), or anti-fuses)) used to store logic blocks, logic fabric, data, or other data in look-up tables (LUTs) and the like.

The baseband circuitry 510 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 510 are discussed with regard to FIG. 4.

The RFEMs 515 may comprise a millimeter wave (mm-Wave) RFEM and one or more sub-mmWave radio frequency integrated circuits (RFICs). In some examples, the one or more sub-mmWave RFICs may be physically separated from the mmWave RFEM. The RFICs may include connections to one or more antennas or antenna arrays (see, e.g., antenna array 611 of FIG. 4), and the RFEM may be connected to multiple antennas. In some examples, both mmWave and sub-mmWave radio functions may be implemented in the same physical RFEM 515, which incorporates both mmWave antennas and sub-mmWave.

The memory circuitry 520 may include any number and type of memory devices used to provide for a given amount of system memory. As examples, the memory circuitry 520 may include one or more of volatile memory, such as random access memory (RAM), dynamic RAM (DRAM) or synchronous dynamic RAM (SDRAM), and nonvolatile memory (NVM), such as high-speed electrically erasable memory (commonly referred to as Flash memory), phase change random access memory (PRAM), or magnetoresistive random access memory (MRAM), or combinations of them, among others. The memory circuitry 520 may be developed in accordance with a Joint Electron Devices Engineering Council (JEDEC) low power double data rate (LPDDR)-based design, such as LPDDR2, LPDDR3, LPDDR4, or the like. Memory circuitry 520 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, or soldered onto a motherboard using a ball grid array (BGA). In low power embodiments, the memory circuitry 520 may be on-die memory or registers associated with the application circuitry 505. To provide for persistent storage of information such as data, applications, operating systems and so forth, memory circuitry 520 may include one or more mass storage devices, which may include, for example, a solid state disk drive (SSDD), hard disk drive (HDD), a micro HDD, resistance change memories, phase change memories, holographic memories, or chemical memories, among others. In some examples, the computer platform 500 may incorporate the three-dimensional (3D) cross-point (XPOINT) memories from Intel® and Micron®.

The removable memory circuitry 523 may include devices, circuitry, enclosures, housings, ports or receptacles, among others, used to couple portable data storage devices with the platform 500. These portable data storage devices may be used for mass storage purposes, and may include, for example, flash memory cards (e.g., Secure Digital (SD) cards, microSD cards, xD picture cards), and USB flash drives, optical discs, or external HDDs, or combinations of them, among others.

The platform 500 may also include interface circuitry (not shown) for connecting external devices with the platform 500. The external devices connected to the platform 500 using the interface circuitry include sensor circuitry 521 and electro-mechanical components (EMCs) 522, as well as removable memory devices coupled to removable memory circuitry 523.

The sensor circuitry 521 include devices, modules, or subsystems whose purpose is to detect events or changes in its environment and send the information (e.g., sensor data) about the detected events to one or more other devices, modules, or subsystems. Examples of such sensors include inertial measurement units (IMUs) such as accelerometers, gyroscopes, or magnetometers; microelectromechanical systems (MEMS) or nanoelectromechanical systems (NEMS) including 3-axis accelerometers, 3-axis gyroscopes, or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other audio capture devices, or combinations of them, among others.

The EMCs 522 include devices, modules, or subsystems whose purpose is to enable the platform 500 to change its state, position, or orientation, or move or control a mechanism, system, or subsystem. Additionally, the EMCs 522 may be configured to generate and send messages or signaling to other components of the platform 500 to indicate a current state of the EMCs 522. Examples of the EMCs 522 include one or more power switches, relays, such as electromechanical relays (EMRs) or solid state relays (SSRs), actuators (e.g., valve actuators), an audible sound generator, a visual warning device, motors (e.g., DC motors or stepper motors), wheels, thrusters, propellers, claws, clamps, hooks, or combinations of them, among other electro-mechanical components. In some examples, the platform 500 is configured to operate one or more EMCs 522 based on one or more captured events, instructions, or control signals received from a service provider or clients, or both.

In some examples, the interface circuitry may connect the platform 500 with positioning circuitry 545. The positioning circuitry 545 includes circuitry to receive and decode signals transmitted or broadcasted by a positioning network of a GNSS. Examples of a GNSS include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, among other systems. The positioning circuitry 545 comprises various hardware elements (e.g., including hardware devices such as switches, filters, amplifiers, antenna elements, and the like to facilitate OTA communications) to communicate with components of a positioning network, such as navigation satellite constellation nodes. In some examples, the positioning circuitry 545 may include a Micro-PNT IC that uses a master timing clock to perform position tracking or estimation without GNSS assistance. The positioning circuitry 545 may also be part of, or interact with, the baseband circuitry 410 or RFEMs 515, or both, to communicate with the nodes and components of the positioning network. The positioning circuitry 545 may also provide data (e.g., position data, time data) to the application circuitry 505, which may use the data to synchronize operations with various infrastructure (e.g., radio base stations), for turn-by-turn navigation applications, or the like.

In some examples, the interface circuitry may connect the platform 500 with Near-Field Communication (NFC) circuitry 540. The NFC circuitry 540 is configured to provide contactless, short-range communications based on radio frequency identification (RFID) standards, in which magnetic field induction is used to enable communication between NFC circuitry 540 and NFC-enabled devices external to the platform 500 (e.g., an "NFC touchpoint"). The NFC circuitry 540 includes an NFC controller coupled with an antenna element and a processor coupled with the NFC controller. The NFC controller may be a chip or IC providing NFC functionalities to the NFC circuitry 540 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 540, or initiate data transfer between the NFC circuitry 540 and another active NFC device (e.g., a smartphone or an NFC-enabled POS terminal) that is proximate to the platform 500.

The driver circuitry 546 may include software and hardware elements that operate to control particular devices that are embedded in the platform 500, attached to the platform 500, or otherwise communicatively coupled with the platform 500. The driver circuitry 546 may include individual drivers allowing other components of the platform 500 to interact with or control various input/output (I/O) devices that may be present within, or connected to, the platform 500. For example, the driver circuitry 546 may include a display driver to control and allow access to a display device, a touchscreen driver to control and allow access to a touchscreen interface of the platform 500, sensor drivers to obtain sensor readings of sensor circuitry 521 and control and allow access to sensor circuitry 521, EMC drivers to obtain actuator positions of the EMCs 522 or control and allow access to the EMCs 522, a camera driver to control and allow access to an embedded image capture device, audio drivers to control and allow access to one or more audio devices.

The power management integrated circuitry (PMIC) 525 (also referred to as "power management circuitry 525") may manage power provided to various components of the platform 500. In particular, with respect to the baseband circuitry 510, the PMIC 525 may control power-source selection, voltage scaling, battery charging, or DC-to-DC conversion. The PMIC 525 may be included when the platform 500 is capable of being powered by a battery 530, for example, when the device is included in a UE 101, 201, 301.

In some examples, the PMIC 525 may control, or otherwise be part of, various power saving mechanisms of the platform 500. For example, if the platform 500 is in an RRC_Connected state, where it is still connected to the RAN node as it expects to receive traffic shortly, then it may enter a state known as Discontinuous Reception Mode (DRX) after a period of inactivity. During this state, the platform 500 may power down for brief intervals of time and thus save power. If there is no data traffic activity for an extended period of time, then the platform 500 may transition off to an RRC_Idle state, where it disconnects from the network and does not perform operations such as channel quality feedback or handover. This can allow the platform 500 to enter a very low power state, where it periodically wakes up to listen to the network and then powers down again. In some examples, the platform 500 may not receive data in the RRC_Idle state and instead must transition back to RRC_Connected state to receive data. An additional power saving mode may allow a device to be unavailable to the network for periods longer than a paging interval (ranging from seconds to a few hours). During this time, the device may be unreachable to the network and may power down completely. Any data sent during this time may incurs a large delay and it is assumed the delay is acceptable.

A battery 530 may power the platform 500, although in some examples the platform 500 may be deployed in a fixed location, and may have a power supply coupled to an electrical grid. The battery 530 may be a lithium ion battery, a metal-air battery, such as a zinc-air battery, an aluminum-air battery, or a lithium-air battery, among others. In some examples, such as in V2X applications, the battery 530 may be a typical lead-acid automotive battery.

In some examples, the battery 530 may be a "smart battery," which includes or is coupled with a Battery Management System (BMS) or battery monitoring integrated circuitry. The BMS may be included in the platform 500 to track the state of charge (SoCh) of the battery 530. The BMS may be used to monitor other parameters of the battery 530 to provide failure predictions, such as the state of health (SoH) and the state of function (SoF) of the battery 530. The BMS may communicate the information of the battery 530 to the application circuitry 505 or other components of the platform 500. The BMS may also include an analog-to-digital (ADC) convertor that allows the application circuitry 505 to directly monitor the voltage of the battery 530 or the current flow from the battery 530. The battery parameters may be used to determine actions that the platform 500 may perform, such as transmission frequency, network operation, or sensing frequency, among others.

A power block, or other power supply coupled to an electrical grid may be coupled with the BMS to charge the battery 530. In some examples, the power block 530 may be replaced with a wireless power receiver to obtain the power wirelessly, for example, through a loop antenna in the computer platform 500. In these examples, a wireless battery charging circuit may be included in the BMS. The specific charging circuits chosen may depend on the size of the battery 530, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

The user interface circuitry 550 includes various input/output (I/O) devices present within, or connected to, the platform 500, and includes one or more user interfaces designed to enable user interaction with the platform 500 or peripheral component interfaces designed to enable peripheral component interaction with the platform 500. The user interface circuitry 550 includes input device circuitry and output device circuitry. Input device circuitry includes any physical or virtual means for accepting an input including one or more physical or virtual buttons (e.g., a reset button), a physical keyboard, keypad, mouse, touchpad, touchscreen, microphones, scanner, or headset, or combinations of them, among others. The output device circuitry includes any physical or virtual means for showing information or otherwise conveying information, such as sensor readings, actuator position(s), or other information. Output device circuitry may include any number or combinations of audio or visual display, including one or more simple visual outputs or indicators (e.g., binary status indicators (e.g., light emitting diodes (LEDs)), multi-character visual outputs, or more complex outputs such as display devices or touchscreens (e.g., Liquid Chrystal Displays (LCD), LED displays, quantum dot displays, or projectors), with the output of characters, graphics, or multimedia objects being generated or produced from the operation of the platform 500. The output device circuitry may also include speakers or other audio emitting devices, or printer(s). In some examples, the sensor circuitry 521 may be used as the input device circuitry (e.g., an image capture device or motion capture device), and one or more EMCs may be used as the output device circuitry (e.g., an actuator to provide haptic feedback). In another example, NFC circuitry comprising an NFC controller coupled with an antenna element and a processing device may be included to read electronic tags or connect with another NFC-enabled device. Peripheral component interfaces may include, but are not limited to, a non-volatile memory port, a USB port, an audio jack, or a power supply interface.

Although not shown, the components of platform 500 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus or IX may be a proprietary bus or IX, for example, used in a SoC based system. Other bus or IX systems may be included, such as an I2C interface, an SPI interface, point-to-point interfaces, and a power bus, among others.

Figure 4:
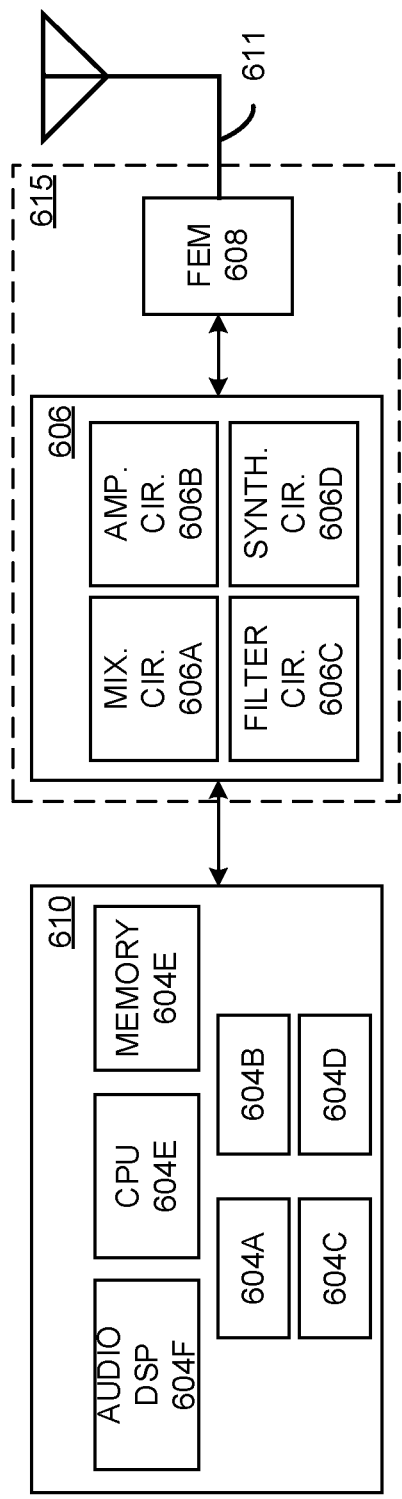
FIG. 4 illustrates example components of baseband circuitry and radio front end circuitry.

FIG. 4 illustrates example components of baseband circuitry 610 and radio front end modules (RFEM) 615. The baseband circuitry 610 can correspond to the baseband circuitry 410 and 510 of FIGS. 2 and 3, respectively. The RFEM 615 can correspond to the RFEM 415 and 515 of FIGS. 2 and 3, respectively. As shown, the RFEMs 615 may include Radio Frequency (RF) circuitry 606, front-end module (FEM) circuitry 608, antenna array 611 coupled together.

The baseband circuitry 610 includes circuitry or control logic, or both, configured to carry out various radio or network protocol and control functions that enable communication with one or more radio networks using the RF circuitry 606. The radio control functions may include, but are not limited to, signal modulation and demodulation, encoding and decoding, and radio frequency shifting. In some examples, modulation and demodulation circuitry of the baseband circuitry 610 may include Fast-Fourier Transform (FFT), precoding, or constellation mapping and demapping functionality. In some examples, encoding and decoding circuitry of the baseband circuitry 610 may include convolution, tail-biting convolution, turbo, Viterbi, or Low Density Parity Check (LDPC) encoder and decoder functionality. Modulation and demodulation and encoder and decoder functionality are not limited to these examples and may include other suitable functionality in other examples. The baseband circuitry 610 is configured to process baseband signals received from a receive signal path of the RF circuitry 606 and to generate baseband signals for a transmit signal path of the RF circuitry 606. The baseband circuitry 610 is configured to interface with application circuitry (e.g., the application circuitry 405, 505 shown in FIGS. 2 and 3) for generation and processing of the baseband signals and for controlling operations of the RF circuitry 606. The baseband circuitry 610 may handle various radio control functions.

The aforementioned circuitry and control logic of the baseband circuitry 610 may include one or more single or multi-core processors. For example, the one or more processors may include a 3G baseband processor 604A, a 4G or LTE baseband processor 604B, a 5G or NR baseband processor 604C, or some other baseband processor(s) 604D for other existing generations, generations in development or to be developed in the future (e.g., sixth generation (6G)). In some examples, some or all of the functionality of baseband processors 604A-D may be included in modules stored in the memory 604G and executed using a Central Processing Unit (CPU) 604E. In some examples, some or all of the functionality of baseband processors 604A-D may be provided as hardware accelerators (e.g., FPGAs or ASICs) loaded with the appropriate bit streams or logic blocks stored in respective memory cells. In some examples, the memory 604G may store program code of a real-time OS (RTOS) which, when executed by the CPU 604E (or other baseband processor), is to cause the CPU 604E (or other baseband processor) to manage resources of the baseband circuitry 610, schedule tasks, or carry out other operations. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 610 includes one or more audio digital signal processor(s) (DSP) 604F. The audio DSP(s) 604F include elements for compression and decompression and echo cancellation and may include other suitable processing elements in some examples.

In some examples, each of the processors 604A-604E include respective memory interfaces to send and receive data to and from the memory 604G. The baseband circuitry 610 may further include one or more interfaces to communicatively couple to other circuitries or devices, such as an interface to send and receive data to and from memory external to the baseband circuitry 610; an application circuitry interface to send and receive data to and from the application circuitry 405, 505 of FIGS. 2 and 4); an RF circuitry interface to send and receive data to and from RF circuitry 606 of FIG. 4; a wireless hardware connectivity interface to send and receive data to and from one or more wireless hardware elements (e.g., Near Field Communication (NFC) components, Bluetooth®/Bluetooth® Low Energy components, Wi-Fi® components, and/or the like); and a power management interface to send and receive power or control signals to and from the PMIC 525.

In some examples (which may be combined with the above described examples), the baseband circuitry 610 includes one or more digital baseband systems, which are coupled with one another using an interconnect subsystem and to a CPU subsystem, an audio subsystem, and an interface subsystem. The digital baseband subsystems may also be coupled to a digital baseband interface and a mixed-signal baseband subsystem using another interconnect subsystem. Each of the interconnect subsystems may include a bus system, point-to-point connections, network-on-chip (NOC) structures, or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, among other components. In some examples, the baseband circuitry 610 may include protocol processing circuitry with one or more instances of control circuitry (not shown) to provide control functions for the digital baseband circuitry or radio frequency circuitry (e.g., the radio front end modules 615).

Although not shown in FIG. 4, in some examples, the baseband circuitry 610 includes individual processing device(s) to operate one or more wireless communication protocols (e.g., a "multi-protocol baseband processor" or "protocol processing circuitry") and individual processing device(s) to implement PHY layer functions. In some examples, the PHY layer functions include the aforementioned radio control functions. In some examples, the protocol processing circuitry operates or implements various protocol layers or entities of one or more wireless communication protocols. For example, the protocol processing circuitry may operate LTE protocol entities or 5G NR protocol entities, or both, when the baseband circuitry 610 or RF circuitry 606, or both, are part of mmWave communication circuitry or some other suitable cellular communication circuitry. In this example, the protocol processing circuitry can operate MAC, RLC, PDCP, SDAP, RRC, and NAS functions. In some examples, the protocol processing circuitry may operate one or more IEEE-based protocols when the baseband circuitry 610 or RF circuitry 606, or both, are part of a Wi-Fi communication system. In this example, the protocol processing circuitry can operate Wi-Fi MAC and logical link control (LLC) functions. The protocol processing circuitry may include one or more memory structures (e.g., 604G) to store program code and data for operating the protocol functions, as well as one or more processing cores to execute the program code and perform various operations using the data. The baseband circuitry 610 may also support radio communications for more than one wireless protocol.

The various hardware elements of the baseband circuitry 610 discussed herein may be implemented, for example, as a solder-down substrate including one or more integrated circuits (ICs), a single packaged IC soldered to a main circuit board or a multi-chip module containing two or more ICs. In some examples, the components of the baseband circuitry 610 may be suitably combined in a single chip or chipset, or disposed on a same circuit board. In some examples, some or all of the constituent components of the baseband circuitry 610 and RF circuitry 606 may be implemented together such as, for example, a system on a chip (SoC) or System-in-Package (SiP). In some examples, some or all of the constituent components of the baseband circuitry 610 may be implemented as a separate SoC that is communicatively coupled with and RF circuitry 606 (or multiple instances of RF circuitry 606). In some examples, some or all of the constituent components of the baseband circuitry 610 and the application circuitry 405, 505 may be implemented together as individual SoCs mounted to a same circuit board (e.g., a "multi-chip package").

In some examples, the baseband circuitry 610 may provide for communication compatible with one or more radio technologies. For example, the baseband circuitry 610 may support communication with an E-UTRAN or other WMAN, a WLAN, or a WPAN. Examples in which the baseband circuitry 610 is configured to support radio communications of more than one wireless protocol may be referred to as multi-mode baseband circuitry.

The RF circuitry 606 may enable communication with wireless networks using modulated electromagnetic radiation through a non-solid medium. In some examples, the RF circuitry 606 may include switches, filters, or amplifiers, among other components, to facilitate the communication with the wireless network. The RF circuitry 606 may include a receive signal path, which may include circuitry to down-convert RF signals received from the FEM circuitry 608 and provide baseband signals to the baseband circuitry 610. The RF circuitry 606 may also include a transmit signal path, which may include circuitry to up-convert baseband signals provided by the baseband circuitry 610 and provide RF output signals to the FEM circuitry 608 for transmission.

The receive signal path of the RF circuitry 606 includes mixer circuitry 606a, amplifier circuitry 606b and filter circuitry 606c. In some examples, the transmit signal path of the RF circuitry 606 may include filter circuitry 606c and mixer circuitry 606a. The RF circuitry 606 also includes synthesizer circuitry 606d for synthesizing a frequency for use by the mixer circuitry 606a of the receive signal path and the transmit signal path. In some examples, the mixer circuitry 606a of the receive signal path may be configured to down-convert RF signals received from the FEM circuitry 608 based on the synthesized frequency provided by synthesizer circuitry 606d. The amplifier circuitry 606b may be configured to amplify the down-converted signals and the filter circuitry 606c may be a low-pass filter (LPF) or band-pass filter (BPF) configured to remove unwanted signals from the down-converted signals to generate output baseband signals. Output baseband signals may be provided to the baseband circuitry 610 for further processing. In some examples, the output baseband signals may be zero-frequency baseband signals, although this is not a requirement. In some examples, the mixer circuitry 606a of the receive signal path may comprise passive mixers.

In some examples, the mixer circuitry 606a of the transmit signal path may be configured to up-convert input baseband signals based on the synthesized frequency provided by the synthesizer circuitry 606d to generate RF output signals for the FEM circuitry 608. The baseband signals may be provided by the baseband circuitry 610 and may be filtered by filter circuitry 606c.

In some examples, the mixer circuitry 606a of the receive signal path and the mixer circuitry 606a of the transmit signal path may include two or more mixers and may be arranged for quadrature downconversion and upconversion, respectively. In some examples, the mixer circuitry 606a of the receive signal path and the mixer circuitry 606a of the transmit signal path may include two or more mixers and may be arranged for image rejection (e.g., Hartley image rejection). In some examples, the mixer circuitry 606a of the receive signal path and the mixer circuitry 606a of the transmit signal path may be arranged for direct downconversion and direct upconversion, respectively. In some examples, the mixer circuitry 606a of the receive signal path and the mixer circuitry 606a of the transmit signal path may be configured for super-heterodyne operation.

In some examples, the output baseband signals and the input baseband signals may be analog baseband signals. In some examples, the output baseband signals and the input baseband signals may be digital baseband signals, and the RF circuitry 606 may include analog-to-digital converter (ADC) and digital-to-analog converter (DAC) circuitry and the baseband circuitry 610 may include a digital baseband interface to communicate with the RF circuitry 606.

In some dual-mode examples, a separate radio IC circuitry may be provided for processing signals for each spectrum, although the techniques described here are not limited in this respect.

In some examples, the synthesizer circuitry 606d may be a fractional-N synthesizer or a fractional N/N+1 synthesizer, although other types of frequency synthesizers may used. For example, synthesizer circuitry 606d may be a delta-sigma synthesizer, a frequency multiplier, or a synthesizer comprising a phase-locked loop with a frequency divider.

The synthesizer circuitry 606d may be configured to synthesize an output frequency for use by the mixer circuitry 606a of the RF circuitry 606 based on a frequency input and a divider control input. In some examples, the synthesizer circuitry 606d may be a fractional N/N+1 synthesizer.

In some examples, frequency input may be provided by a voltage controlled oscillator (VCO), although that is not a requirement. Divider control input may be provided by either the baseband circuitry 610 or the application circuitry 405/505 depending on the desired output frequency. In some examples, a divider control input (e.g., N) may be determined from a look-up table based on a channel indicated by the application circuitry 405, 505.

The synthesizer circuitry 606d of the RF circuitry 606 may include a divider, a delay-locked loop (DLL), a multiplexer and a phase accumulator. In some examples, the divider may be a dual modulus divider (DMD) and the phase accumulator may be a digital phase accumulator (DPA). In some examples, the DMD may be configured to divide the input signal by either N or N+1 (e.g., based on a carry out) to provide a fractional division ratio. In some examples, the DLL may include a set of cascaded, tunable, delay elements, a phase detector, a charge pump and a D-type flip-flop. The delay elements may be configured to break a VCO period up into Nd equal packets of phase, where Nd is the number of delay elements in the delay line. In this way, the DLL provides negative feedback to help ensure that the total delay through the delay line is one VCO cycle.

In some examples, synthesizer circuitry 606d may be configured to generate a carrier frequency as the output frequency, while in other examples, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some examples, the output frequency may be a LO frequency (fLO). In some examples, the RF circuitry 606 may include an IQ or polar converter.

The FEM circuitry 608 may include a receive signal path, which may include circuitry configured to operate on RF signals received from antenna array 611, amplify the received signals and provide the amplified versions of the received signals to the RF circuitry 606 for further processing. The FEM circuitry 608 may also include a transmit signal path, which may include circuitry configured to amplify signals for transmission provided by the RF circuitry 606 for transmission by one or more of antenna elements of antenna array 611. The amplification through the transmit or receive signal paths may be done solely in the RF circuitry 606, solely in the FEM circuitry 608, or in both the RF circuitry 606 and the FEM circuitry 608.

In some examples, the FEM circuitry 608 may include a TX/RX switch to switch between transmit mode and receive mode operation. The FEM circuitry 608 may include a receive signal path and a transmit signal path. The receive signal path of the FEM circuitry 608 may include an LNA to amplify received RF signals and provide the amplified received RF signals as an output (e.g., to the RF circuitry 606). The transmit signal path of the FEM circuitry 608 may include a power amplifier (PA) to amplify input RF signals (e.g., provided by RF circuitry 606), and one or more filters to generate RF signals for subsequent transmission by one or more antenna elements of the antenna array 611.

The antenna array 611 comprises one or more antenna elements, each of which is configured convert electrical signals into radio waves to travel through the air and to convert received radio waves into electrical signals. For example, digital baseband signals provided by the baseband circuitry 610 is converted into analog RF signals (e.g., modulated waveform) that will be amplified and transmitted using the antenna elements of the antenna array 611 including one or more antenna elements (not shown). The antenna elements may be omnidirectional, directional, or a combination thereof. The antenna elements may be formed in a multitude of arranges as are known and/or discussed herein. The antenna array 611 may comprise microstrip antennas or printed antennas that are fabricated on the surface of one or more printed circuit boards. The antenna array 611 may be formed as a patch of metal foil (e.g., a patch antenna) in a variety of shapes, and may be coupled with the RF circuitry 606 and/or FEM circuitry 608 using metal transmission lines or the like.

Processors of the application circuitry 405/505 and processors of the baseband circuitry 610 may be used to execute elements of one or more instances of a protocol stack. For example, processors of the baseband circuitry 610, alone or in combination, may be used execute Layer 3, Layer 2, or Layer 1 functionality, while processors of the application circuitry 405, 505 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 5:
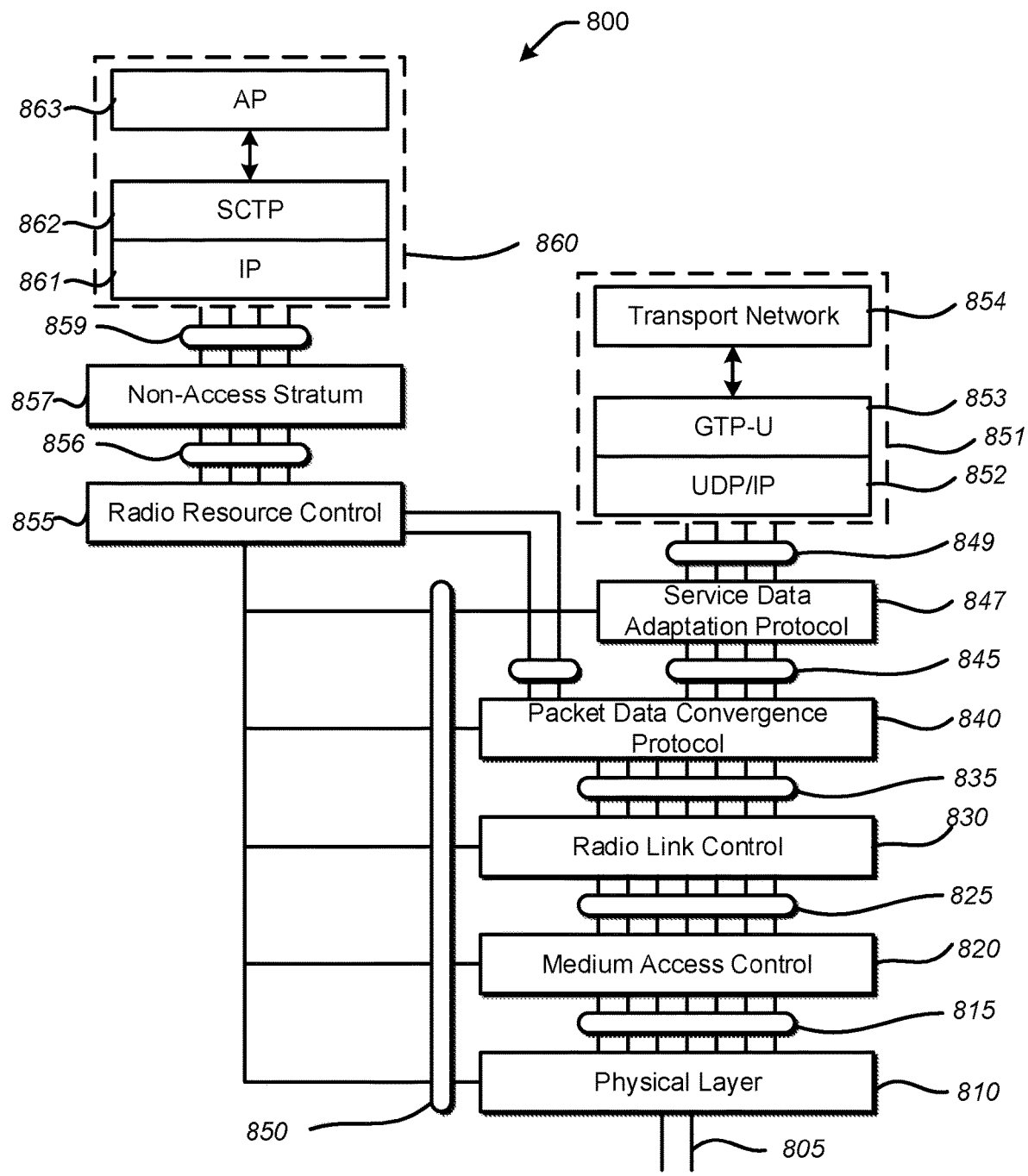
FIG. 5 illustrates example protocol functions that may be implemented in wireless communication systems.

FIG. 5 illustrates various protocol functions that may be implemented in a wireless communication device. In particular, FIG. 5 includes an arrangement 800 showing interconnections between various protocol layers/entities. The following description of FIG. 5 is provided for various protocol layers and entities that operate in conjunction with the 5G NR system standards and the LTE system standards, but some or all of the aspects of FIG. 5 may be applicable to other wireless communication network systems as well.

The protocol layers of arrangement 800 may include one or more of PHY 810, MAC 820, RLC 830, PDCP 840, SDAP 847, RRC 855, and NAS layer 857, in addition to other higher layer functions not illustrated. The protocol layers may include one or more service access points (e.g., items 859, 856, 850, 849, 845, 835, 825, and 815 in FIG. 5) that may provide communication between two or more protocol layers.

The PHY 810 may transmit and receive physical layer signals 805 that may be received from or transmitted to one or more other communication devices. The physical layer signals 805 may include one or more physical channels, such as those discussed herein. The PHY 810 may further perform link adaptation or adaptive modulation and coding (AMC), power control, cell search (e.g., for initial synchronization and handover purposes), and other measurements used by higher layers, such as the RRC 855. The PHY 810 may still further perform error detection on the transport channels, forward error correction (FEC) coding and decoding of the transport channels, modulation and demodulation of physical channels, interleaving, rate matching, mapping onto physical channels, and MIMO antenna processing. In some examples, an instance of PHY 810 may process requests from and provide indications to an instance of MAC 820 using one or more PHY-SAP 815. In some examples, requests and indications communicated using PHY-SAP 815 may comprise one or more transport channels.

Instance(s) of MAC 820 may process requests from, and provide indications to, an instance of RLC 830 using one or more MAC-SAPs 825. These requests and indications communicated using the MAC-SAP 825 may include one or more logical channels. The MAC 820 may perform mapping between the logical channels and transport channels, multiplexing of MAC service data units (SDUs) from one or more logical channels onto transport blocks (TBs) to be delivered to PHY 810 using the transport channels, de-multiplexing MAC SDUs to one or more logical channels from TBs delivered from the PHY 810 using transport channels, multiplexing MAC SDUs onto TBs, scheduling information reporting, error correction through HARQ, and logical channel prioritization.

Instance(s) of RLC 830 may process requests from and provide indications to an instance of PDCP 840 using one or more radio link control service access points (RLC-SAP) 835. These requests and indications communicated using RLC-SAP 835 may include one or more RLC channels. The RLC 830 may operate in a plurality of modes of operation, including: Transparent Mode™, Unacknowledged Mode (UM), and Acknowledged Mode (AM). The RLC 830 may execute transfer of upper layer protocol data units (PDUs), error correction through automatic repeat request (ARQ) for AM data transfers, and concatenation, segmentation and reassembly of RLC SDUs for UM and AM data transfers. The RLC 830 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 840 may process requests from and provide indications to instance(s) of RRC 855 or instance(s) of SDAP 847, or both, using one or more packet data convergence protocol service access points (PDCP-SAP) 845. These requests and indications communicated using PDCP-SAP 845 may include one or more radio bearers. The PDCP 840 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, or integrity verification).

Instance(s) of SDAP 847 may process requests from and provide indications to one or more higher layer protocol entities using one or more SDAP-SAP 849. These requests and indications communicated using SDAP-SAP 849 may include one or more QoS flows. The SDAP 847 may map QoS flows to data radio bearers (DRBs), and vice versa, and may also mark QoS flow identifiers (QFIs) in DL and UL packets. A single SDAP entity 847 may be configured for an individual PDU session. In the UL direction, the NG-RAN 110 may control the mapping of QoS Flows to DRB(s) in two different ways, reflective mapping or explicit mapping. For reflective mapping, the SDAP 847 of a UE 101 may monitor the QFIs of the DL packets for each DRB, and may apply the same mapping for packets flowing in the UL direction. For a DRB, the SDAP 847 of the UE 101 may map the UL packets belonging to the QoS flows(s) corresponding to the QoS flow ID(s) and PDU session observed in the DL packets for that DRB. To enable reflective mapping, the NG-RAN 310 may mark DL packets over the Uu interface with a QoS flow ID. The explicit mapping may involve the RRC 855 configuring the SDAP 847 with an explicit QoS flow to DRB mapping rule, which may be stored and followed by the SDAP 847. In some examples, the SDAP 847 may only be used in NR embodiments and may not be used in LTE embodiments.

The RRC 855 may configure, using one or more management service access points (M-SAP), aspects of one or more protocol layers, which may include one or more instances of PHY 810, MAC 820, RLC 830, PDCP 840 and SDAP 847. In some examples, an instance of RRC 855 may process requests from and provide indications to one or more NAS entities 857 using one or more RRC-SAPs 856. The main services and functions of the RRC 855 may include broadcast of system information (e.g., included in master information blocks (MIBs) or system information blocks (SIBs) related to the NAS), broadcast of system information related to the access stratum (AS), paging, establishment, maintenance and release of an RRC connection between the UE 101 and RAN 110 (e.g., RRC connection paging, RRC connection establishment, RRC connection modification, and RRC connection release), establishment, configuration, maintenance and release of point to point Radio Bearers, security functions including key management, inter-RAT mobility, and measurement configuration for UE measurement reporting. The MIBs and SIBs may comprise one or more information elements, which may each comprise individual data fields or data structures.

The NAS 857 may form the highest stratum of the control plane between the UE 101 and the AMF 321. The NAS 857 may support the mobility of the UEs 101 and the session management procedures to establish and maintain IP connectivity between the UE 101 and a P-GW in LTE systems.

In some examples, one or more protocol entities of arrangement 800 may be implemented in UEs 101, RAN nodes 111, AMF 321 in NR embodiments or MME 221 in LTE embodiments, UPF 302 in NR embodiments or S-GW 222 and P-GW 223 in LTE embodiments, or the like to be used for control plane or user plane communications protocol stack between the aforementioned devices. In some examples, one or more protocol entities that may be implemented in one or more of UE 101, gNB 111, AMF 321, among others, may communicate with a respective peer protocol entity that may be implemented in or on another device using the services of respective lower layer protocol entities to perform such communication. In some examples, a gNB-CU of the gNB 111 may host the RRC 855, SDAP 847, and PDCP 840 of the gNB that controls the operation of one or more gNB-DUs, and the gNB-DUs of the gNB 111 may each host the RLC 830, MAC 820, and PHY 810 of the gNB 111.

In some examples, a control plane protocol stack may include, in order from highest layer to lowest layer, NAS 857, RRC 855, PDCP 840, RLC 830, MAC 820, and PHY 810. In this example, upper layers 860 may be built on top of the NAS 857, which includes an IP layer 861, an SCTP 862, and an application layer signaling protocol (AP) 863.

In some examples, such as NR embodiments, the AP 863 may be an NG application protocol layer (NGAP or NG-AP) 863 for the NG interface 113 defined between the NG-RAN node 111 and the AMF 321, or the AP 863 may be an Xn application protocol layer (XnAP or Xn-AP) 863 for the Xn interface 112 that is defined between two or more RAN nodes 111.

The NG-AP 863 may support the functions of the NG interface 113 and may comprise elementary procedures (EPs). An NG-AP EP may be a unit of interaction between the NG-RAN node 111 and the AMF 321. The NG-AP 863 services may include two groups: UE-associated services (e.g., services related to a UE 101) and non-UE-associated services (e.g., services related to the whole NG interface instance between the NG-RAN node 111 and AMF 321). These services may include functions such as, but not limited to: a paging function for the sending of paging requests to NG-RAN nodes 111 involved in a particular paging area; a UE context management function for allowing the AMF 321 to establish, modify, or release a UE context in the AMF 321 and the NG-RAN node 111; a mobility function for UEs 101 in ECM-CONNECTED mode for intra-system HOs to support mobility within NG-RAN and inter-system HOs to support mobility from/to EPS systems; a NAS Signaling Transport function for transporting or rerouting NAS messages between UE 101 and AMF 321; a NAS node selection function for determining an association between the AMF 321 and the UE 101; NG interface management function(s) for setting up the NG interface and monitoring for errors over the NG interface; a warning message transmission function for providing means to transfer warning messages using NG interface or cancel ongoing broadcast of warning messages; a configuration transfer function for requesting and transferring of RAN configuration information (e.g., SON information or performance measurement (PM) data) between two RAN nodes 111 using CN 120, or combinations of them, among others.

The XnAP 863 may support the functions of the Xn interface 112 and may comprise XnAP basic mobility procedures and XnAP global procedures. The XnAP basic mobility procedures may comprise procedures used to handle UE mobility within the NG RAN 111 (or E-UTRAN 210), such as handover preparation and cancellation procedures, SN Status Transfer procedures, UE context retrieval and UE context release procedures, RAN paging procedures, or dual connectivity related procedures, among others. The XnAP global procedures may comprise procedures that are not related to a specific UE 101, such as Xn interface setup and reset procedures, NG-RAN update procedures, or cell activation procedures, among others.

In LTE embodiments, the AP 863 may be an S1 Application Protocol layer (S1-AP) 863 for the S1 interface 113 defined between an E-UTRAN node 111 and an MME, or the AP 863 may be an X2 application protocol layer (X2AP or X2-AP) 863 for the X2 interface 112 that is defined between two or more E-UTRAN nodes 111.

The S1 Application Protocol layer (S1-AP) 863 may support the functions of the S1 interface, and similar to the NG-AP discussed previously, the S1-AP may include S1-AP EPs. An S1-AP EP may be a unit of interaction between the E-UTRAN node 111 and an MME 221 within an LTE CN 120. The S1-AP 863 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 863 may support the functions of the X2 interface 112 and may include X2AP basic mobility procedures and X2AP global procedures. The X2AP basic mobility procedures may include procedures used to handle UE mobility within the E-UTRAN 120, such as handover preparation and cancellation procedures, SN Status Transfer procedures, UE context retrieval and UE context release procedures, RAN paging procedures, or dual connectivity related procedures, among others. The X2AP global procedures may comprise procedures that are not related to a specific UE 101, such as X2 interface setup and reset procedures, load indication procedures, error indication procedures, or cell activation procedures, among others.

The SCTP layer (alternatively referred to as the SCTP/IP layer) 862 may provide guaranteed delivery of application layer messages (e.g., NGAP or XnAP messages in NR embodiments, or S1-AP or X2AP messages in LTE embodiments). The SCTP 862 may ensure reliable delivery of signaling messages between the RAN node 111 and the AMF 321/MME 221 based in part on the IP protocol, supported by the IP 861. The Internet Protocol layer (IP) 861 may be used to perform packet addressing and routing functionality. In some embodiments the IP layer 861 may use point-to-point transmission to deliver and convey PDUs. In this regard, the RAN node 111 may include L2 and L1 layer communication links (e.g., wired or wireless) with the MME/AMF to exchange information.

In some examples, a user plane protocol stack may include, in order from highest layer to lowest layer, SDAP 847, PDCP 840, RLC 830, MAC 820, and PHY 810. The user plane protocol stack may be used for communication between the UE 101, the RAN node 111, and UPF 302 in NR embodiments or an S-GW 222 and P-GW 223 in LTE embodiments. In this example, upper layers 851 may be built on top of the SDAP 847, and may include a user datagram protocol (UDP) and IP security layer (UDP/IP) 852, a General Packet Radio Service (GPRS) Tunneling Protocol for the user plane layer (GTP-U) 853, and a User Plane PDU layer (UP PDU) 863.

The transport network layer 854 (also referred to as a "transport layer") may be built on IP transport, and the GTP-U 853 may be used on top of the UDP/IP layer 852 (comprising a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 853 may be used for carrying user data within the GPRS core network and between the radio access network and the core network. The user data transported can be packets in any of IPv4, IPv6, or PPP formats, for example. The UDP/IP 852 may provide checksums for data integrity, port numbers for addressing different functions at the source and destination, and encryption and authentication on the selected data flows. The RAN node 111 and the S-GW 222 may utilize an S1-U interface to exchange user plane data using a protocol stack comprising an L1 layer (e.g., PHY 810), an L2 layer (e.g., MAC 820, RLC 830, PDCP 840, and/or SDAP 847), the UDP/IP layer 852, and the GTP-U 853. The S-GW 222 and the P-GW 223 may utilize an S5/S8a interface to exchange user plane data using a protocol stack comprising an L1 layer, an L2 layer, the UDP/IP layer 852, and the GTP-U 853. As discussed previously, NAS protocols may support the mobility of the UE 101 and the session management procedures to establish and maintain IP connectivity between the UE 101 and the P-GW 223.

Moreover, although not shown by FIG. 5, an application layer may be present above the AP 863 and/or the transport network layer 854. The application layer may be a layer in which a user of the UE 101, RAN node 111, or other network element interacts with software applications being executed, for example, by application circuitry 405 or application circuitry 505, respectively. The application layer may also provide one or more interfaces for software applications to interact with communications systems of the UE 101 or RAN node 111, such as the baseband circuitry 610. In some examples, the IP layer or the application layer, or both, may provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

Figure 6:
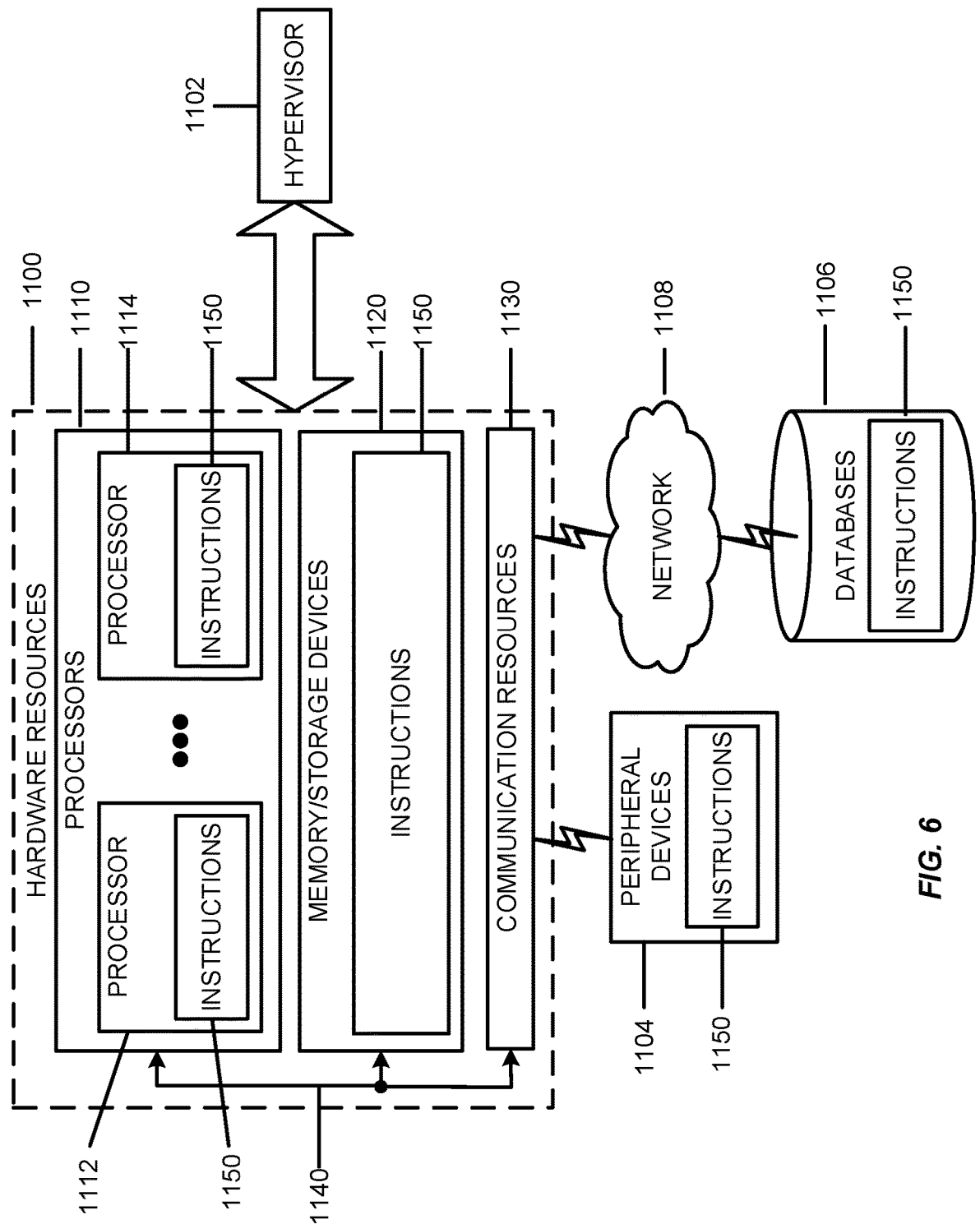
FIG. 6 illustrates an example computer system.

FIG. 6 is a block diagram illustrating components for reading instructions from a machine-readable or computer-readable medium (e.g., a non-transitory machine-readable storage medium) and performing any one or more of the techniques described herein. Specifically, FIG. 6 shows a diagrammatic representation of hardware resources 1100 including one or more processors (or processor cores) 1110, one or more memory or storage devices 1120, and one or more communication resources 1130, each of which may be communicatively coupled using a bus 1140. For embodiments where node virtualization (e.g., NFV) is utilized, a hypervisor 1102 may be executed to provide an execution environment for one or more network slices or sub-slices to utilize the hardware resources 1100.

The processors 1110 may include a processor 1112 and a processor 1114. The processor(s) 1110 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1120 may include main memory, disk storage, or any suitable combination thereof. The memory/storage devices 1120 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, or solid-state storage, or combinations of them, among others.

The communication resources 1130 may include interconnection or network interface components or other suitable devices to communicate with one or more peripheral devices 1104 or one or more databases 1106 using a network 1108. For example, the communication resources 1130 may include wired communication components (e.g., for coupling using USB), cellular communication components, NFC components, Bluetooth® (or Bluetooth® Low Energy) components, Wi-Fi® components, and other communication components.

Instructions 1150 may comprise software, a program, an application, an applet, an app, or other executable code for causing at least any of the processors 1110 to perform any one or more of the methodologies discussed herein. The instructions 1150 may reside, completely or partially, within at least one of the processors 1110 (e.g., within the processor's cache memory), the memory/storage devices 1120, or any suitable combination thereof. Furthermore, any portion of the instructions 1150 may be transferred to the hardware resources 1100 from any combination of the peripheral devices 1104 or the databases 1106. Accordingly, the memory of processors 1110, the memory/storage devices 1120, the peripheral devices 1104, and the databases 1106 are examples of computer-readable and machine-readable media.

This disclosure describes a process 1200 is shown for measurement gap (MG) pattern use and management for next generation (5G) wireless communication systems. The process 1200 may be performed for frequency range one (FR1) and/or frequency range two (FR2) compatible systems. In some applications, the higher frequency bands in range FR2 are aimed at providing short range very high data rate capability for the 5G radio. With 5G wireless technology configured to carry higher speed data relative to conventional wireless networks, the additional bandwidth of these higher frequency bands are needed. Generally, FR2 includes frequencies in the ranges of 24250-52600 megahertz (MHz), while FR1 communications use frequencies between 410-7125 MHz.

This disclosure includes improvements for MG applicability mechanisms, such as for FR1 and/or FR2 scenarios. For example, the MG pattern usage subsequently described can be applied (e.g., by a UE) when a Pcell is FR2, and when E-UTRA-NR Dual Connectivity (EN-DC) is enabled with per-FR measurements and a FR2 measurement object (MO) configured for a device (e.g., UE, gNB, etc.). In some embodiments, for a standalone operation (SA) mode, if a UE indicates support for any measurement for any measurement pattern (e.g., patterns 0-11, subsequently described) with a measurement gap length (MGL) of less than 6 milliseconds (ms), and a measurement gap repetition period (MGRP) of less than 160 ms, the UE is capable of both new radio (NR) and NR+LTE measurements. Additionally, a communications device (e.g., a UE) can be configured for EN-DC communication in a standalone LTE context with the MG pattern usage subsequently described.

More specifically, this disclosure describes several solutions for MG pattern usage. First, mandatory MG patterns for a communications device (e.g., a UE) are described. Second, MG capability reports from LTE radio access technologies (RATs) and NR RATs are described. Third, UE measurement capability from the MG table is shown.

UEs and other communication device can be configured for mandatory MG patterns as now described. The mandatory MG patterns can differ based on the context in which the communication device is performing measurements. In an example, for an LTE standalone case, a UE has no FR2 serving cell. Because the UE has no FR 2 serving cell, the MG patterns 0 and 1 can be mandated, as shown below in Tables 1 and 3. This in in addition to the MG pattern 12-23 mandated by prior EN-DC and NE-DC cases, when per-FR MG capable UE has a FR2 serving cell and is configured with a FR2 MO.

TABLE 1

Applicability for Gap Pattern Configurations supported by the E-UTRA-NR dual connectivity UE or NR-E-UTRA dual connectivity UE

| Measurement Gap Pattern Configuration | Serving Cell | Measurement Purpose | Applicable Gap Pattern ID |
|---|---|---|---|
| Per-UE measurement gap | E-UTRA + FR1, or E-UTRA + FR2, or E-UTRA + FR1 + FR2 | Non-NR RAT FR1 and/or FR2 | 0, 1, 2, 3 0-11 |
| | | non-NR RAT and FR1 and/or FR2 | 0, 1, 2, 3, 4, 6, 7, 8, 10 |
| Per FR measurement gap | E-UTRA and, FR1 if configured | Non-NR RAT | 0, 1, 2, 3 |
| | FR2 if configured | | No gap |
| | E-UTRA and, FR1 if configured | FR1 only | 0-11 |
| | FR2 if configured | | No gap |
| | E-UTRA and, FR1 if configured | FR2 only | No gap |
| | FR2 if configured | | 12-23, 0, 1 |
| | E-UTRA and, FR1 if configured | Non-NR RAT and FR1 | 0, 1, 2, 3, 4, 6, 7, 8, 10 |
| | FR2 if configured | | No gap |
| | E-UTRA and, FR1 if configured | FR1 and FR2 | 0-11 |
| | FR2 if configured | | 12-23, 0, 1 |
| | E-UTRA and, FR1 if configured | Non-NR RAT and FR2 | 0, 1, 2, 3, 4, 6, 7, 8, 10 |

TABLE 1-continued

Applicability for Gap Pattern Configurations supported by the E-UTRA-NR dual connectivity UE or NR-E-UTRA dual connectivity UE

| Measurement Gap Pattern Configuration | Serving Cell | Measurement Purpose | Applicable Gap Pattern ID |
|---|---|---|---|
| | FR2 if configured | | 12-23, 0, 1 |
| | E-UTRA and, FR1 if configured | Non-NR RAT and FR1 and FR2 | 0, 1, 2, 3, 4, 6, 7, 8, 10 |
| | FR2 if configured | | 12-23, 0, 1 |

Generally, in F-UTRA-NR dual connectivity mode, if GSM or UTRA PP 1, TDD or UTRA FDD inter-RAT frequency layer is configured to be monitored, only measurement gap pattern #0 and #1 can be used for per-FR gap in F-UTRA and FR1 if configured, or for per-UF gap. In E-UTRA-NR dual connectivity mode, non-NR RAT includes E-UTRA, UTRA and/or GSM. In NR-E-UTRA dual connectivity mode, non-NR RAT means E-UTRA. In E-UTRA-NR dual connectivity mode, the gap patterns with short MGL (e.g., gap patterns #2, 3, 6, 7, 8, 10) are supported by UEs which support shortMeasurementGap-r14. In NR-E-UTRA dual connectivity mode, the measurement gap patterns #2, 3, 6, 7, 8, 10 are supported by the UEs which indicate the capability signaling of supported gap patterns (e.g., supportedGapPattern) to the network. Generally, when E-UTRA inter-frequency RSTD measurements are configured and the UE requires measurement gaps for performing such measurements, only gap pattern #0 can be used.

For new radio standalone (NR SA), new radio carrier aggregation (NR CA), and NR-DC cases, the MG pattern 12-23 is applied in Table 9.1.2-3 of the 3GPP TS 38.133, version 15.4.0 Release 15 published January 2019, without any definition of mandatory MG. For example, a per-UE MG capable UE has a FR2 serving cell only and is configured with FR2 MO only. In another example, a per-FR MG capable UE has a FR2 serving cell and is configured with FR2 MO. As subsequently described, and as shown in Table 2, mandatory MG patterns #0, #1 are included in these and other scenarios.

The mandatory MG patterns can be specified for these scenarios as follows. The MG patterns #0 and #1 are applicable for the measurement when per-FR MG capable UE has a FR2 serving cell and is configured with a FR2 MO or when per-UE MG capable UE has FR2 serving cell only and is configured with FR2 MO only. These are shown in Table 2.

In some embodiments, additional MG patterns are introduced and mandated to support measurement when a per-FR MG capable UE has a FR2 serving cell and is configured with a FR2 MO, or when per-UE MG capable UE has FR2 serving cell only and is configured with FR2 MO only. The mandatory MG pattern that is introduced can be, for example, the MG with 20 ms measurement gap repetition periodicity (MGRP)+5.5 ms measurement gap length (MGL), 40 ms MGRP+5.5 ms MGL, 80 ms MGRP+5.5 ms MGL, or any combination thereof, or like combination(s).

TABLE 2

Applicability for Gap Pattern Configurations supported by the UE with NR standalone operation (with single carrier, NR CA and NR-DC configuration)

| Measurement Gap Pattern Configuration | Serving Cell | Measurement Purpose | Applicable Gap Pattern ID |
|---|---|---|---|
| Per-UE measurement gap | FR1, or FR1 + FR2 | E-UTRA only | 0, 1, 2, 3 |
|  |  | FR1 and/or FR2 | 0-11 |
|  |  | E-UTRAN and FR1 and/or FR2 | 0, 1, 2, 3, 4, 6, 7, 8, 10 |
|  | FR2 | E-UTRA only | 0, 1, 2, 3 |
|  |  | FR1 only | 0-11 |
|  |  | FR1 and FR2 | 0-11 |
|  |  | E-UTRAN and FR1 and/or FR2 | 0, 1, 2, 3, 4, 6, 7, 8, 10 |
|  |  | FR2 only | 12-23, 0, 1 |
| Per FR measurement gap | FR1 if configured | E-UTRA only | 0, 1, 2, 3 |
|  | FR2 if configured |  | No gap |
|  | FR1 if configured | FR1 only | 0-11 |
|  | FR2 if configured |  | No gap |
|  | FR1 if configured | FR2 only | No gap |
|  | FR2 if configured |  | 12-23, 0, 1 |
|  | FR1 if configured | E-UTRA and FR1 | 0, 1, 2, 3, 4, 6, 7, 8, 10 |
|  | FR2 if configured |  | No gap |
|  | FR1 if configured | FR1 and FR2 | 0-11 |
|  | FR2 if configured |  | 12-23, 0, 1 |
|  | FR1 if configured | E-UTRA and FR2 | 0, 1, 2, 3, 4, 6, 7, 8, 10 |
|  | FR2 if configured |  | 12-23, 0, 1 |
|  | FR1 if configured | E-UTRA and FR1 and FR2 | 0, 1, 2, 3, 4, 6, 7, 8, 10 |
|  | FR2 if configured |  | 12-23, 0, 1 |

Generally, when F-UTRA inter-RAT RSTD measurements are configured and the UF requires measurement gaps for performing such measurements, only Gap Pattern #0 can be used. The measurement purpose which includes E-UTRA measurements also includes inter-RAT FUTRA RSRP and RSRQ measurements for F-CID. The measurement gap patterns #2, 3, 6, 7, 8, and 10 are supported by the UFs which indicate the capability signaling of supportedGapPattern to network. If a per-UF measurement gap is configured with MG timing advance of $T_{MG}$ ins, the measurement gap starts at time $T_{MG}$ ms advanced to the end of the latest subframe occurring immediately before the configured measurement gap among all serving cells subframes. If per-FR measurenet gap for FR1 is configured with MG timing advance of $T_{MG}$ ins, the measurement gap for FR1 starts at time $T_{MG}$ ms advanced to the end of the latest subframe occurring immediately before the configured measurement gap among serving cells subframes in FR1. If per-FR measurenet gap for FR2 is configured with MG timing advance of $T_{MG}$ ms, the measurement gap for FR2 starts at time $T_{MG}$ ms advanced to the end of the latest subframe occurring immediately before the configured measurement gap among serving cells subframes in FR2. $T_{MG}$ is the MG timing advance value provided in mgta. In determining the measurement gap starting point, UE shall use the DL timing of the latest subframe occurring immediately before the configured measurement gap among serving cells. Generally, NR-DC in Rel-15 only includes the scenarios where all serving cells in MCG in FR1 and all serving cells in SCG in FR2.

The LTE RATs and NR RATs can be configured to provide MG capability reports for UEs. For In EN-DC scenarios, the reporting of the MG capability is as follows. First, the LTE RRC signaling message shortMeasurementGap is used to signal whether a UE supports gap patterns #2 and #3, such as for per-UE capability and the FR1 gap of a per-FR gap. Second, the LTE RRC signaling message measGapPatterns is used to signal whether a UE supports gap patterns 4 to 11, such as for per-UE capability and the FR1 gap of a per-FR gap. Third, the NR RRC signaling message supportedGapPattern, which is 22 bits, can be used to signal whether a UE supports gap patterns 2 to 23, such as for the FR2 gap of a per-FR gap.

In some embodiments, a per-FR MG-capable UE can be configured to report the messages shortMeasurementGap+measGapPatterns for a FR1 MG using an LTE radio resource control (RRC). In addition, the UE can be configured to report the message supportedGapPattern for a FR2 MG using an NR RRC. However, there are 22 bits in the message supportedGapPattern which may have some overlapped UE capability information with the RRC signaling information by the LTE RAT. Generally, the UE does not report different capabilities for MG by LTE and by NR RRC signaling. Therefore, there are two options for EN-DC scenarios. First, during EN-DC scenarios, the UE can be configured to disable or mute the bits 2 to 11 in the message supportedGapPattern for per-FR capable UEs. The network is configured to reply only on the indication on shortMeasurementGap+measGapPatterns using LTE RRC signaling. In a second option, for EN-DC scenarios, the UE is mandated to report the same MG capability information for messages shortMeasurementGap+measGapPatterns and for bits 2 to 11 of the message supportedGapPattern.

In an aspect, the UE measurement capability can be determined from the from the MG table. In an NR stand-alone scenario, if a UE indicates support for any pattern 0-11 with MGL<6 ms and MGRP<160 ms, the UE is thus configured for both NR and NR+LTE measurement. The MG pattern can be found in the applicability Table 2 above, which is based on Table 9.1.2-3 of 3GPP TS 38.133 version 15.4.1 Release 15, published in April 2019. The changes to Table 9.1.2-3 included in Table 2 have been discussed previously. Based on its capability, a UE can be configured to use the MG patterns 0, 1, 2, 3, 4, 6, 7, 8, 10 (MGL<6 ms and MGRP<160 ms) to do LTE+NR measurement. In some embodiments, the UE can be configured to use those MG patterns to do NR measurement because in Table 2, the MG pattern 0-11 can be used for NR measurement for per-UE MG capable UE, and also because NR FR1 measurement can be used for a per-FR MG capable UE. For a per-UE MG capable UE, the patterns (e.g., any pattern 0-11 with MGL<6 ms and MGRP<160 ms) can be used by the UE for LTE+NR measurement and NR measurement, except when both a serving cell and an MO are in FR2 only. Additionally or alternatively, for a per-FR MG capable UE, those patterns (e.g., any pattern 0-11 with MGL<6 ms and MGRP<160 ms) can be used for LTE+NR FR1 measurement and NR FR1 only measurement, with an FR1 serving cell.

Generally, in both EN-DC and NE-DC scenarios, Table 1 shows that if a UE can support any MG patterns in pattern #0, 1, 2, 3, 4, 6, 7, 8, 10, the UE can do LTE+NR measurement and NR measurement by using those supported MG patterns. Generally, MG patterns #0, 1, 2, 3, 4, 6, 7, 8, 10 indicates that the MGL<6 ms and the MGRP<160 ms. In some embodiments, for a per-UE MG capable UE, the MG patterns (e.g., any pattern 0-11 with MGL<6 ms and MGRP<160 ms) can be used for LTE+NR measurement and NR measurement. Additionally or alternatively, for a per-FR MG capable UE, the MG patterns (e.g., any pattern 0-11 with MGL<6 ms and MGRP<160 ms) can be used for LTE+NR FR1 measurement and NR FR1 only measurement.

In a general aspect, for a LTE standalone scenario, shown in Table 3 (which corresponds to Table 8.1.2.1-1 in 3GPP TS36.133, version 15.4.0, published January 2019, incorporated herein by reference in entirety), for a per-UE MG capable UE, the MG patterns (e.g., any pattern 0-11 with MGL<6 ms and MGRP<160 ms) can be used for LTE+NR measurement and NR measurement. Additionally or alternatively, for a per-FR MG capable UE, the MG patterns (e.g., any pattern 0-11 with MGL<6 ms and MGRP<160 ms) can be used for LTF+NR FR1 measurement and NR FR1 only measurement.

TABLE 3

Gap Pattern Configurations supported by the UE

| Gap Pattern ID | Measurement Gap Length (MGL, ms) | Measurement Gap Repetition Period (MGRP, ms) | Minimum Available Time for Inter-Frequency and Inter-RAT Measurements During 480 ms Period (Tinter1, ms) | Measurement Purpose |
|---|---|---|---|---|
| 0 | 6 | 40 | 60 | Inter-Frequency E-UTRAN FDD and TDD, UTRAN FDD, GERAN, LCR TDD, HRPD, CDMA2000 1x, inter-RAT NR |
| 1 | 6 | 80 | 30 | Inter-Frequency E-UTRAN FDD and TDD, UTRAN FDD, GERAN, LCR TDD, HRPD, CDMA2000 1x, inter-RAT NR |
| 2 | 3 | 40 | 24 | Inter-Frequency E-UTRAN FDD and TDD for cells with time difference as specified below. inter-RAT NR |
| 3 | 3 | 80 | 12 | Inter-Frequency E-UTRAN FDD and TDD for cells with time difference as specified in Table 3 Inter-RAT NR |
| [4] | [6] | [20] | 120 | Inter-RAT NR, Inter-Frequency E-UTRAN FDD and TDD |
| [6] | [4] | [20] | 72 | Inter-RAT NR, Inter-Frequency E-UTRAN FDD and TDD |
| [7] | 4 | 40 | 36 | Inter-RAT NR, Inter-Frequency E-UTRAN FDD and TDD |
| [8] | 4 | 80 | 18 | Inter-RAT NR, Inter-Frequency E-UTRAN FDD and TDD |

TABLE 3-continued

Gap Pattern Configurations supported by the UE

| Gap Pattern ID | Measurement Gap Length (MGL, ms) | Measurement Gap Repetition Period (MGRP, ms) | Minimum Available Time for Inter-Frequency and Inter-RAT Measurements During 480 ms Period (Tinter1, ms) | Measurement Purpose |
|---|---|---|---|---|
| [10] | 3 | 20 | 48 | Inter-RAT NR, Inter-Frequency E-UTRAN FDD and TDD |

Generally, when determining UE requirements using Tinter1 for GP2, 3, 4, 6, 7, 8, 10, Tinter1=[60] for GP2, GP4, GP6, GP7, GP10 and Tinter1=[30] for GP3 and GP8 are used. Generally, the gap patterns 2 or 3 can be configured for E-UTRA measurement when UEs support shortMeasurementGap-r14 or can be configured for inter-RAT NR measurement only. Generally, the NR measurement requirement may not be scaled by Tinter. Generally, the gap patterns 6, 7, 8, and 10 are supported by UEs which are configured to perform both E-UTRA inter-frequency measurement and inter-RAT NR measurement when UEs support shortMeasurementGap-r14 or supported by UEs configured to perform inter-RAT NR measurement only. Generally, the gap pattern 4 supported by UEs which are configured to perform both E-UTRA inter-frequency measurement and inter-RAT NR measurement or supported by UEs configured to perform inter-RAT NR measurement only. Generally, when the gap pattern 6 is used, the Tinter for E-UTRA interfrequency measurements is 48 ms corresponding to the first 3 ms of the 4 ms gap. Generally, when gap pattern 7 is used, the Tinter for E-UTRA interfrequency measurements is 24 ms corresponding to the first 3 ms of the 4 ms gap. Generally, when gap pattern 8 is is used, the Tinter for E-UTRA interfrequency measurements is 12 ms corresponding to the first 3 ms of the 4 ms gap.

In a general aspect, the use case for MG pattern with MGL<6 ms and MGRP<160 ms may be based on Table 4, below.

TABLE 4

MG Patterns and Use Cases

| Mode | MG Pattern | Use Cases (MOs) |
|---|---|---|
| EN-DC and NE-DC | Any pattern 0-11 with MGL < 6 ms and MGRP < 160 ms; e.g., any pattern in patterns {0, 1, 2, 3, 4, 6, 7, 8, 10} | For per-UE MG capable UE, these MG patterns can be used for LTE + NR measurement and NR measurement. For per-FR MG capable UE these MG patterns can be used for LTE + NR FR1 measurement and NR FR1 only measurement. |
| NR SA, NR CA and NR-DC | | For per-UE MG capable UE these patterns can be used for LTE + NR measurement and NR measurement except when both serving cell and MO are in FR2 only. For per-FR MG capable UE these MG patterns can be used for LTE + NR FR1 measurement and NR FR1 only measurement with FR1 serving cell. |
| LTE SA | | For per-UE MG capable UE these MG patterns can be used for LTE + NR measurement and NR measurement. For per-FR MG capable UE these MG |

TABLE 4-continued

MG Patterns and Use Cases

| Mode | MG Pattern | Use Cases (MOs) |
|---|---|---|
| | | patterns can be used for LTE + NR FR1 measurement and NR FR1 only measurement. |

Figure 7:
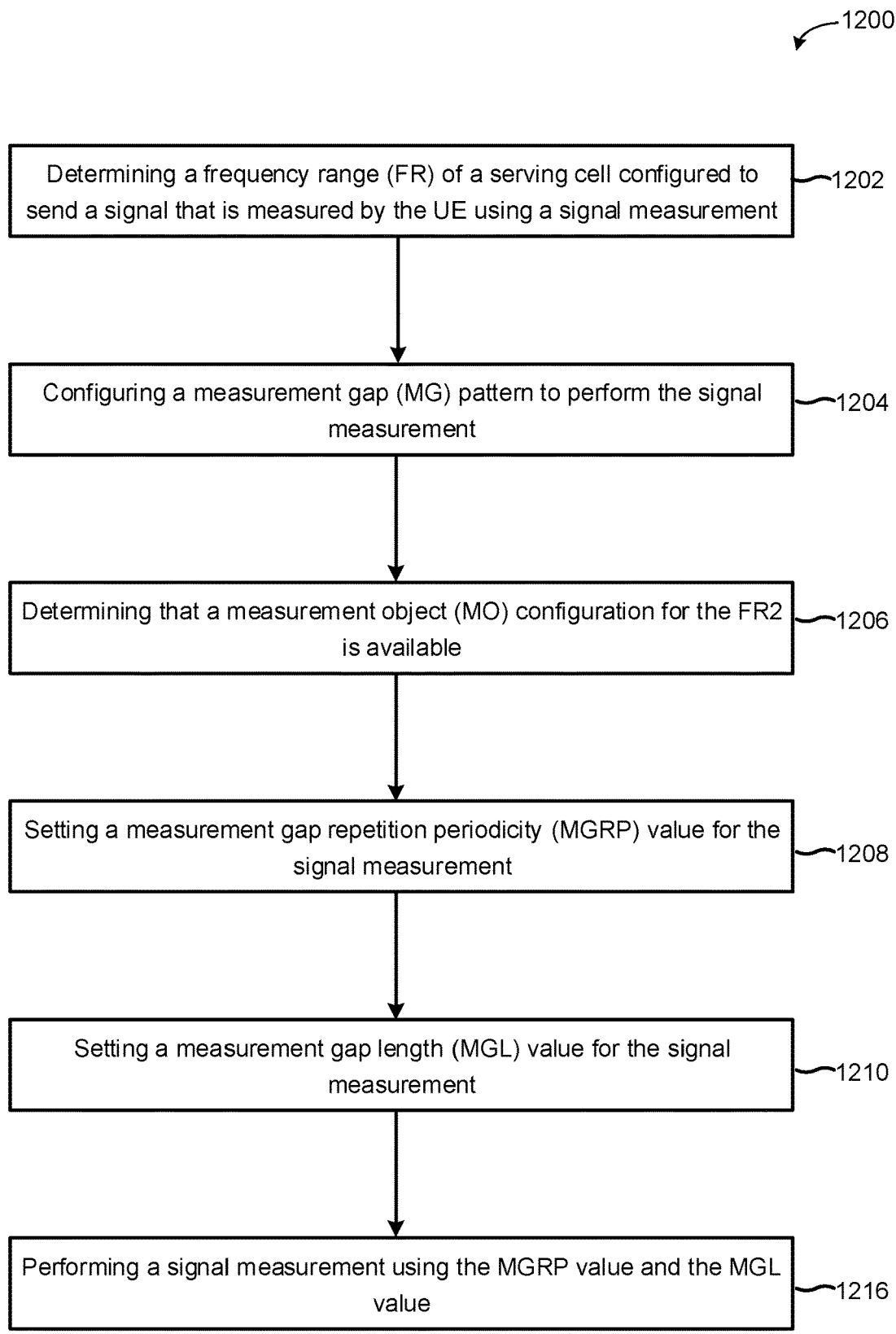
FIGS. 7-8 illustrate an example procedure for measurement gap pattern use and management for wireless communication systems, according to various embodiments.

Returning to process 1200 of FIG. 7, the process 1200 for measurement gap pattern use and management for wireless communication systems is now described. A UE can be configured for using mandatory MG patterns when operating in particular scenarios. For example, the UE is configured for per-FR MG patterns. In another example, the UE is configured for per-UE MG patterns. In some embodiments, the process 1200 is performed for configuring, by user equipment (UE), one or more measurement gap patterns for wireless communication in a new radio (NR) network.

In a general aspect, the process 1200 comprises determining (1202) a frequency range (FR) of a serving cell configured to send a signal that is measured by the UE using a signal measurement. The process comprises configuring (1204) a measurement gap (MG) pattern to perform the signal measurement. Configuring the measurement gap pattern comprises determining that the frequency range of the serving cell includes frequencies of a second frequency range (FR2). Configuring the measurement gap pattern comprises determining (1206) that a measurement object (MO) configuration for the FR2 is available. In response to determining that the configuration with the MO for the FR2 is available, the UE is configured to set (1208) a measurement gap repetition periodicity (MGRP) value for the signal measurement. Additionally, in response to determining that the configuration with the MO for the FR2 is available, the UE is configured to set (1210) a measurement gap length (MGL) value for the signal measurement. The process includes performing (1212) a signal measurement using the MGRP value and the MGL value.

In some embodiments, the MG pattern comprises a mandatory MG pattern, wherein the MGRP value is one of 40 milliseconds or 80 milliseconds, and wherein the MGL is 6 milliseconds. In some embodiments, the MGRP value is one of 20 milliseconds, 40 milliseconds or 80 milliseconds, and wherein the MGL value is 5.5 milliseconds.

In some embodiments, determining that the MO configuration for the FR2 is available comprises determining that no other MO configuration is available. In some embodiments, determining that the MO configuration for the FR2 is available comprises determining that a MO configuration for a first frequency range (FR1) is available in addition to the MO configuration for FR2. In some embodiments, determining that the MO configuration for the FR2 is available comprises determining that a MO configuration for an evolved universal mobile telecommunications system terrestrial radio access (E-UTRA) scenario is available in addition to the MO configuration for the FR2. In some embodiments, determining that the MO configuration for the FR2 is available comprises determining that a MO configuration for a non-NR radio access technology (non-NR RAT) is available in addition to the MO configuration for the FR2.

In some embodiments, the process 1200 includes determining a mode of operation of the UE. The process includes generating, by the UE, a MG pattern capability report based on the mode of operation. Generally, the MG pattern capability report indicates that any MG pattern comprising the MGL value of less than or equal to 6 milliseconds and the MGRP value of less than 160 milliseconds is supported for the signal measurement. In some embodiments, the mode of operation comprises one of E-UTRA-NR Dual Connectivity (EN-DC), NR-E-UTRA Dual Connectivity (NE-DC), stand-alone new radio (NR SA), new radio carrier aggregation (NR CA), new radio dual connectivity (NR-DC), or stand-alone long term evolution (LTE SA). In some embodiments, the mode of operation comprises EN-DC. Generating the MG pattern capability report comprise: disabling a bits 2~11 in a supportedGapPattern message. In some embodiments, the mode of operation comprises EN-DC. Generating the MG pattern capability report comprises reporting same MG capability data between shortMeasurementGap+measGapPatterns messages and bits 2~11 of a supportedGapPattern message.

Figure 8:
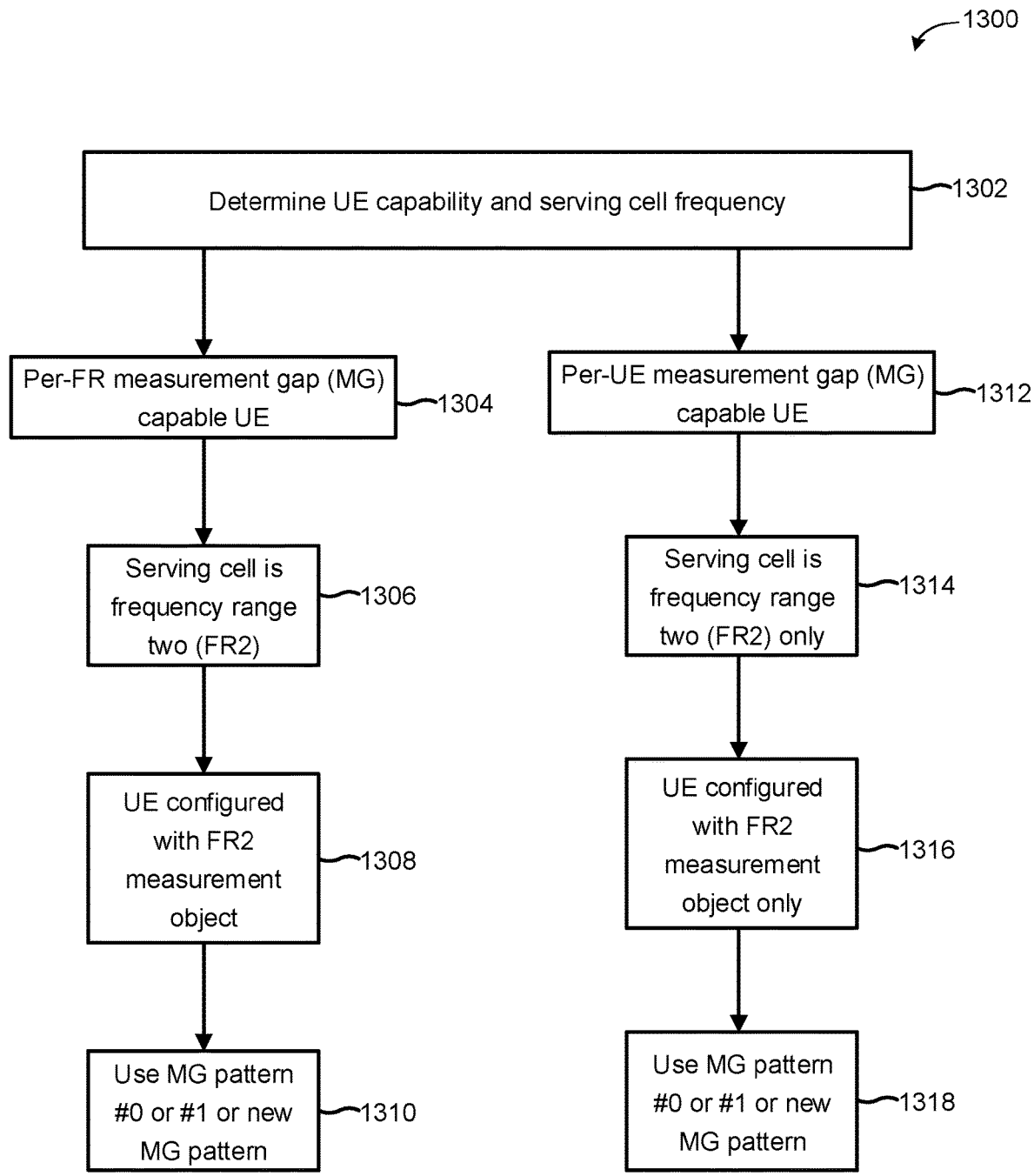

Turning to FIG. 8, a process 1300 for measurement gap pattern use and management for wireless communication systems is now described. The UE is configured to determine (1302) a capability and a serving cell frequency. The UE determines that the UE is per-FR MG capable (1304) or per-UE MG capable (1312). The UE determines whether the serving cell is FR2 (1306) or FR2 only (1314). The UE determines that a MO FR2 is received (1308) or that a MO FR2 is received only (1316), and no other MOs are received. The UE uses (1310, 1318) MG patterns #0, 1, or a newly mandated MG pattern subsequently defined. In other words, the UE is configured to use MG pattern #0 and 1 as being applicable for the measurement when per-FR MG capable UE has a FR2 serving cell and is configured with a FR2 MO (measurement object). Alternatively, when the UE is per-UE MG capable and has a FR2 serving cell only, and the UE is configured with FR2 MO only, the MG patterns #0 or 1 are applicable. Alternatively, another MG pattern is mandated for supporting measurement when the UE is a per-FR MG capable UE, has a FR2 serving cell, and is configured with a FR2 MO. In some embodiments, when the UE is a per-UE MG capable UE, when the UE has a FR2 serving cell only, and when the UE and is configured with FR2 MO only, the additional mandatory MG pattern can be used. In some embodiments, additional mandatory MG pattern includes the MG with 20 ms MGRP+5.5 ms MGL, 40 ms MGRP+5.5 ms MGL, and/or 80 ms MGRP+5.5 ms MGL.

In a general aspect, when the UE is in an EN-DC mode, the UE, when generating the capability report, is configured to disable or mute the bit 2~11 in the supportedGapPattern for per-FR capable UEs. The network only replies on the indication on shortMeasurementGap+measGapPatterns by LTE RRC signaling. Alternatively, the UE, when operating in EN-DC, is mandated to report the same MG capability information between shortMeasurementGap+measGapPatterns messages and for bits 2~11 of a supportedGapPattern message.

In a general aspect, a UE can use any of MG patterns #0, 1, 2, 3, 4, 6, 7, 8, and 10 for the modes EN-DC and NE-DC, for the modes NR SA, NR CA and NR-DC, and for the mode LTE SA. For EN-DC and NE-DC, and of gap patterns #0, 1, 2, 3, 4, 6, 7, 8, and 10 are used for per-UE MG capable UE for LTE+NR measurement and NR measurement. In some embodiments, for EN-DC and NE-DC, and of gap patterns #0, 1, 2, 3, 4, 6, 7, 8, and 10 are used for per-FR MG capable UE for LTE+NR FR1 measurement and NR FR1 only measurement.

In some embodiments, for modes including NR SA, NR CA and NR-DC, any of MG patterns #0, 1, 2, 3, 4, 6, 7, 8, and 10 are used for per-UE MG capable UE for LTE+NR measurement and NR measurement except when both serving cell and MO are in FR2 only. In some embodiments, for modes including NR SA, NR CA and NR-DC, any of MG patterns #0, 1, 2, 3, 4, 6, 7, 8, and 10 are used for per-FR MG capable UE those patterns can be used for LTE+NR FR1 measurement and NR FR1 only measurement with FR1 serving cell.

In some embodiments, for the LTE SA mode, a UE can use any of MG patterns #0, 1, 2, 3, 4, 6, 7, 8, and 10 for per-UE MG capable UEs for LTE+NR measurement and NR measurement. In some embodiments, for the LTE SA mode, a UE can use any of MG patterns #0, 1, 2, 3, 4, 6, 7, 8, and 10 for per-FR MG capable UE for LTE+NR FR1 measurement and NR FR1 only measurement.

In some examples, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. In some examples, circuitry associated with a UE, base station, network element, or other component described above in connection with one or more of the preceding figures may be configured to operate in accordance with one or more of the examples set forth below in the example section.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The methods described here may be implemented in software, hardware, or a combination thereof, in different embodiments. In addition, the order of the blocks of the methods may be changed, and various elements may be added, reordered, combined, omitted, modified, and the like. Various modifications and changes may be made as would be obvious to a person skilled in the art having the benefit of this disclosure. The various embodiments described here are meant to be illustrative and not limiting. Many variations, modifications, additions, and improvements are possible. Accordingly, plural instances may be provided for components described here as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component.

The following terms and definitions may be applicable to the examples described herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/DC.

The term "Special Cell" refers to the PCell of the MCG or the PSCell of the SCG for DC operation; otherwise, the term "Special Cell" refers to the Pcell.

Examples

There are some non-limiting examples, according to various embodiments herein:

Example 1 may include a method, comprising: decoding, upon reception from a BS, a message that indicates one or more MG patterns for a UE to use; determining at least one of the one or more MG patterns with respect to one or more measurements.

Example 2 may include the method of example 1 or some other example herein, further comprising measuring one or more reference signals, upon reception, based on the determined at least one MG patterns; and generating a report with respect to the measurement.

Example 3 may include the method of example 1 or 2 or some other example herein, further comprising receiving the message via an LTE RRC signal or NR RRC signal.

Example 4 may include the method of examples 1-3 or some other example herein, wherein the one or more MG patterns are based on Tables 2, 3, and/or 4 in this disclosure.

Example 5 may include the method of example 1-3 or some other example herein, wherein the one or more MG patterns include an indication of an MGRP and an indication of an MGL.

Example 6 may include the method of examples 1-5 or some other example herein, wherein the UE is capable of or is configured with per-FR MG.

Example 7 may include the method of example 6 or some other example herein, further comprising: determining, upon reception of a configuration message for the measurement, a MO in FR2.

Example 8 may include the method of example 7 or some other example herein, further comprising: receiving the configuration message with respect to the measurement, the configuration message indicates the MO in FR2 and other information corresponding to the measurement.

Example 9 may include the method of examples 1-5 or some other example herein, wherein the UE is or is configured to be with per-UE MG capable and is with an FR2 serving cell, and the BS is a gNB or eNB.

Example 10 may include the method of examples 1-9 or some other example herein, wherein the method is executed by the UE in an EN-DC, NE-DC, or NR-NR mode of 5G communications.

Example 11 may include a method, comprising: generating a message to indicate one or more MG patterns that a UE is to support in a communication; and transmitting the message to an BS.

Example 12 may include the method of example 11 or some other example herein, wherein the message includes supportedGapPatter, shortMeasurementGap, and/or measGapPatterns via LTE or NR RRC signaling, further wherein one or more configurations and/or indications regarding the supportedGapPatter, shortMeasurementGap, and/or measGapPatterns are in accordance with Tables 2-4 and FIGS. 12 and 13 in details.

Example 13 may include a method, comprising: receiving a message from a UE via RRC signaling; determining, based on the message, one or more MG patterns with respect to one or more measurements.

Example 14 may include the method of example 13 or some other example herein, wherein the message includes supportedGapPatter, shortMeasurementGap, and/or measGapPatterns.

Example 15 may include the method of examples 13-14 or some other example herein, wherein the method is executed by an eNB in EN-DC mode, or an gNB in a NE-DC or NR-NR mode.

Example 16 may include a method, comprising: determining one or more MG patterns for a UE with respect to a measurement in FR1 and/or FR2; generating a message to indicate the one or more MG patterns; transmitting the message to the UE via LTE or NR RRC signaling.

Example 17 may include the method of example 16 or some other example herein, wherein the determination of the one or more MG patterns is based on a UE capability indicated by the UE.

Example 18 may include the method of examples 16-17 or some other example herein, further comprising transmitting one or more reference signals with respect to the measurement.

Example 19 may include the method of examples 16-18 or some other example herein, wherein the method is executed by an eNB in EN-DC mode, or an gNB in a NE-DC or NR-NR mode

What is claimed is:

1. One or more processors configured for wireless communication by performing operations comprising:
   determining measurement gap (MG) patterns associated with a new radio (NR) frequency range (FR) in a long term evolution (LTE) and NR dual connectivity operation, the MG patterns corresponding to gap pattern identifiers comprising 0, 1, and 12-23 for per frequency range 2 (FR2) measurement gaps;
   generating a message to indicate the one or more MG patterns via LTE radio resource control (RRC) message; and
   preparing the message for transmission to an access node (AN) in the LTE and NR dual connectivity operation.

2. The one or more processors of claim 1, wherein the message includes a first information element (IE) of shortMeasurementGap and a second IE of measGapPatterns to indicate the one or more MG patterns.

3. The one or more processors of claim 2, wherein the message is further to indicate one or more MG patterns that are not supported by a user equipment associated with the one or more processors.

4. The one or more processors of claim 1, wherein the LTE and NR dual connectivity operation is an evolved universal mobile telecommunications system terrestrial radio access new radio (E-UTRA-NR) dual connectivity (EN-DC) operation or a NR-E-UTRA dual connectivity (NE-DC) operation.

5. The one or more processors of claim 1, wherein the NR FR is an NR frequency range 1 (FR1) or NR frequency range 2 (FR2).

6. The one or more processors of claim 5, the operations further comprising:
   determining that a MO configuration for the FR2 is available based on a determination that no other MO configuration is available.

7. The one or more processors of claim 5, the operations further comprising determining that a MO configuration for the FR2 is available based on determining that a MO configuration for a first frequency range (FR1) is available in addition to the MO configuration for FR2.

8. The one or more processors of claim 5, the operations further comprising determining that a MO configuration for the FR2 is available based on determining that a MO configuration for an evolved universal mobile telecommunications system terrestrial radio access (E-UTRA) scenario is available in addition to the MO configuration for the FR2.

9. The one or more processors of claim 5, the operations further comprising determining that a MO configuration for the FR2 is available based on determining that a MO configuration for a non-NR radio access technology (non-NR RAT) is available in addition to the MO configuration for the FR2.

10. The one or more processors of claim 1, the operations further comprising:
    determining a mode of operation; and
    generating a MG pattern capability report based on the mode of operation, the MG pattern capability report indicating that any MG pattern comprising a measurement gap length (MGL) value of less than or equal to 6 milliseconds and a measurement gap repetition periodicity (MGRP) value of less than 160 milliseconds is supported for a signal measurement.

11. The one or more processors of claim 10, wherein the mode of operation comprises one of E-UTRA-NR Dual Connectivity (EN-DC), NR-E-UTRA Dual Connectivity (NE-DC), standalone new radio (NR SA), new radio carrier aggregation (NR CA), new radio dual connectivity (NR-DC), or standalone long term evolution (LTE SA).

12. The one or more processors of claim 10, wherein the mode of operation comprises EN-DC, and wherein generating the MG pattern capability report comprises:
    disabling a bits 2~11 in a supportedGapPattern message.

13. A method for wireless communication comprising:
    decoding a message that includes a first information element (IE) of shortMeasurementGap and a second IE of measGapPatterns to indicate measurement gap (MG) patterns to be supported by a remote device in a long term evolution (LTE) and new radio (NR) dual connectivity (DC) operation, the MG patterns corresponding to gap pattern identifiers comprising 0, 1, and 12-23 for per frequency range 2 (FR2) measurement gaps;
    determining a configuration for transmitting one or more measurement signals and data signals, based on the decoded MG patterns; and
    generating the one or more measurement signals and the data signals, based on the determined configuration.

14. The method of claim 13, further comprising:
generating a message to indicate the one or more MG patterns or the determined configuration; and
transmitting the message to another access node (AN) in the LTE and NR DC operation.

15. The method of claim 14, wherein the access node is a master node or a secondary node (SN) based on an EN-DC or a NE-DC configuration.

16. The method of claim 13, wherein the LTE and NR dual connectivity operation is an evolved universal mobile telecommunications system terrestrial radio access new radio (E-UTRA-NR) dual connectivity (EN-DC) operation or a NR-E-UTRA dual connectivity (NE-DC) operation.

17. The method of claim 13, wherein the IE indicates a NR frequency range (FR) including a NR frequency range 1 (FR1) or NR frequency range 2 (FR2).

18. The method of claim 17, further comprising generating the data signals using FR1 or FR2 based in the information element indicating the NR frequency range.

19. The method claim 13, further comprising transmitting one or more reference signals with respect to the measurement signals.

20. One or more processors for configuring one or more measurement gap patterns for wireless communication in a new radio (NR) network by performing operations comprising:
determining a frequency range (FR) of a serving cell configured to send a signal that is measured by a user equipment using a signal measurement;
configuring a measurement gap (MG) pattern to perform the signal measurement, wherein configuring the measurement gap comprises:
determining that the frequency range of the serving cell includes frequencies of a second frequency range (FR2);
determining that a measurement object (MO) configuration for the FR2 is available;
in response to determining that the configuration with the MO for the FR2 is available, setting a measurement gap repetition periodicity (MGRP) value for the signal measurement, the MGRP being selected from a set of gap patterns corresponding to gap pattern identifiers 0, 1, and 12-23; and
in response to determining that the configuration with the MO for the FR2 is available, setting a measurement gap length (MGL) value for the signal measurement; and
performing a signal measurement using the MGRP value and the MGL value.

* * * * *